(12) United States Patent
Karabinis

(10) Patent No.: US 8,462,860 B2
(45) Date of Patent: Jun. 11, 2013

(54) INCREASED CAPACITY COMMUNICATIONS SYSTEMS, METHODS AND/OR DEVICES

(75) Inventor: Peter D. Karabinis, Reston, VA (US)

(73) Assignee: EICES Research, Inc., Cary, NC (US)

( * ) Notice: Subject to any disclaimer, the term of this patent is extended or adjusted under 35 U.S.C. 154(b) by 904 days.

(21) Appl. No.: 12/481,084

(22) Filed: Jun. 9, 2009

(65) Prior Publication Data

US 2010/0002789 A1    Jan. 7, 2010

Related U.S. Application Data

(60) Provisional application No. 61/078,598, filed on Jul. 7, 2008, provisional application No. 61/100,142, filed on Sep. 25, 2008, provisional application No. 61/116,856, filed on Nov. 21, 2008, provisional application No. 61/117,437, filed on Nov. 24, 2008, provisional application No. 61/119,593, filed on Dec. 3, 2008, provisional application No. 61/155,264, filed on Feb. 25, 2009, provisional application No. 61/163,119, filed on Mar. 25, 2009.

(51) Int. Cl.
*H04K 1/10* (2006.01)
*H04L 27/28* (2006.01)

(52) U.S. Cl.
USPC ............................................ 375/260; 375/259

(58) Field of Classification Search
USPC ......................................................... 375/260
See application file for complete search history.

(56) References Cited

U.S. PATENT DOCUMENTS

| 4,635,276 A | 1/1987 | Karabinis |
| 6,765,969 B1 | 7/2004 | Vook et al. |
| 6,922,570 B2 * | 7/2005 | Awater et al. ................. 455/561 |
| 7,295,637 B2 | 11/2007 | Papathanasiou et al. |
| 7,362,695 B2 * | 4/2008 | Akahori ........................ 370/208 |
| 7,418,053 B2 | 8/2008 | Perlman et al. |
| 7,733,940 B2 * | 6/2010 | Dooley et al. ................. 375/147 |
| 2001/0050926 A1 | 12/2001 | Kumar |
| 2002/0122499 A1 * | 9/2002 | Kannan et al. ................ 375/260 |
| 2002/0159533 A1 | 10/2002 | Crawford |
| 2006/0045196 A1 * | 3/2006 | Reid ............................. 375/261 |
| 2006/0062320 A1 * | 3/2006 | Luz et al. ..................... 375/269 |

(Continued)

FOREIGN PATENT DOCUMENTS

EP  1 328 071 A1   7/2003
EP  1 589 712 A2   10/2005

OTHER PUBLICATIONS

Charalabopoulos et al. "Pre- post- and balanced equalization in OFDM", Vehicular Technology Conference, 2003. VTC 2003-Fall. 2003 IEEE 58$^{th}$ Orlando, FL, USA; Oct. 6-9, 2003; Piscataway, NJ USA, IEEE, US, vol. 5, Oct. 6, 2003, pp. 3145-3148, XP010701495.

(Continued)

*Primary Examiner* — Erin File
(74) *Attorney, Agent, or Firm* — Myers Bigel Sibley & Sajovec, P.A.

(57) ABSTRACT

Communications architectures, systems, devices and/or methods are disclosed that can increase capacity of conventional OFDM/OFDMA systems, devices, methods and/or protocols by as much as 100%. Conventional OFDM/OFDMA transmitter/receiver architectures, methods, systems and/or devices are improved upon via additional signal processing to provide the increased capacity and reduce non-linear distortion effects on higher-order modulation alphabets such as, for example, 256-QAM.

54 Claims, 9 Drawing Sheets

U.S. PATENT DOCUMENTS

| | | | |
|---|---|---|---|
| 2007/0248194 A1* | 10/2007 | Lu ................................ | 375/343 |
| 2007/0281693 A1* | 12/2007 | Ballentin et al. ........... | 455/435.1 |
| 2008/0304605 A1* | 12/2008 | Aziz et al. .................... | 375/347 |
| 2009/0092041 A1* | 4/2009 | Juang ............................ | 370/210 |
| 2009/0168730 A1* | 7/2009 | Baum et al. ................... | 370/336 |
| 2009/0252257 A1* | 10/2009 | Sadowsky et al. ............ | 375/299 |
| 2010/0121617 A1* | 5/2010 | Gruener et al. .................. | 703/2 |
| 2011/0222495 A1* | 9/2011 | Li et al. ......................... | 370/329 |
| 2012/0039379 A1* | 2/2012 | Husen et al. .................. | 375/230 |

OTHER PUBLICATIONS

Dahlmann et al. "3G Evolution HSPA and LTE for Mobile Broadband", 2008, Elsevier Ltd., Oxford US, pp. 383-387, XP002615771.

Holma et al. "LTE for UMTS—OFDMA and SC-FDMA Based Radio Access" 2009, John Wiley & Sons, Ltd., Chichester UK, pp. 76-82, XP002615769.

Invitation to Pay Additional Fees corresponding to International Application No. PCT/US2010/029028; Date of Mailing: Jan. 28, 2011; 11 pages.

Mietzner et al. "Multiple-antenna techniques for wireless communications—a comprehensive literature survey", IEEE Communications Surveys, IEEE, New York, NY, US; vol. 11, No. 2, Apr. 1, 2009, pp. 87-105, XP011261517.

Galda et al., "A Low Complexity Transmitter Structure for OFDM-FDMA Uplink Systems" *IEEE 55$^{th}$ Vehicular Technology Conference*, 2002, vol. 4, May 2002, pp. 1737-1741.

International Search Report and Written Opinion, PCT International Application No. PCT/US2009/003495, Nov. 26, 2009.

Nedic, Slobodan et al. "Per-Bin DFE for Advanced OQAM-based Multi-Carrier Wireless Data Transmission Systems." *2002 International Zurich Seminar on Broadband Communications Access—Transmission—Networking*. (2002): 38-1-38-6. Print.

Karabinis *"Increased Capacity Communications for OFDM-Based Wireless Communications Systems/Methods/Devices"*, U.S. Appl. No. 12/748,931, filed Mar. 29, 2010.

Wikipedia contributors, "Orthogonal frequency-division multiplexing," *Wikipedia, The Free Encyclopedia*, http://en.wikipedia.org/w/index.php?title=Orthogonal_frequency-division_multiplexing&oldid=489673844 (accessed Apr. 25, 2012).

Erik Dahlman et al., *3G Evolution: HSPA and LTE for Mobile Broadband—2d Edition*, (Burlington, MA: Academic Press, 2008), Chapter 4, pp. 43-64.

\* cited by examiner

FIG. 2  Simulation results for case 2 with $\underline{B} = \underline{R}$

Receiver observables: $\begin{cases} \underline{b} = \underline{B} + \overline{\underline{a}}\,\underline{R} + \underline{n} \\ \underline{r} = \underline{R} + \overline{\underline{u}}\,\underline{B} + \underline{v} \end{cases}$ Simulation results for case 3; only $\underline{B}$ is transmitted

- Transmitter remains conventional; transmits $\underline{B}$ only.
- Receiver observables: $\begin{cases} \underline{b} = \underline{B} + \underline{n} \\ \underline{r} = \underline{\bar{u}}\,\underline{B} + \underline{v} \end{cases}$

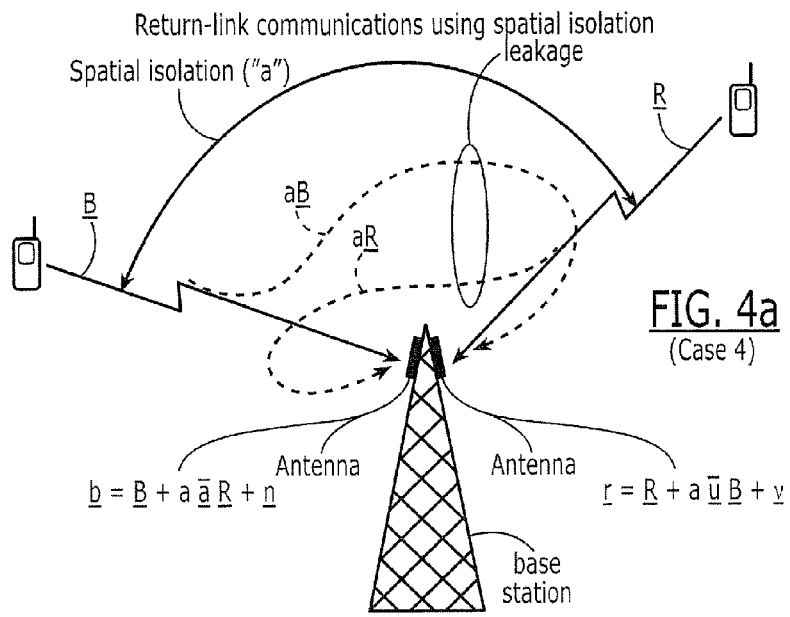
FIG. 4a (Case 4)
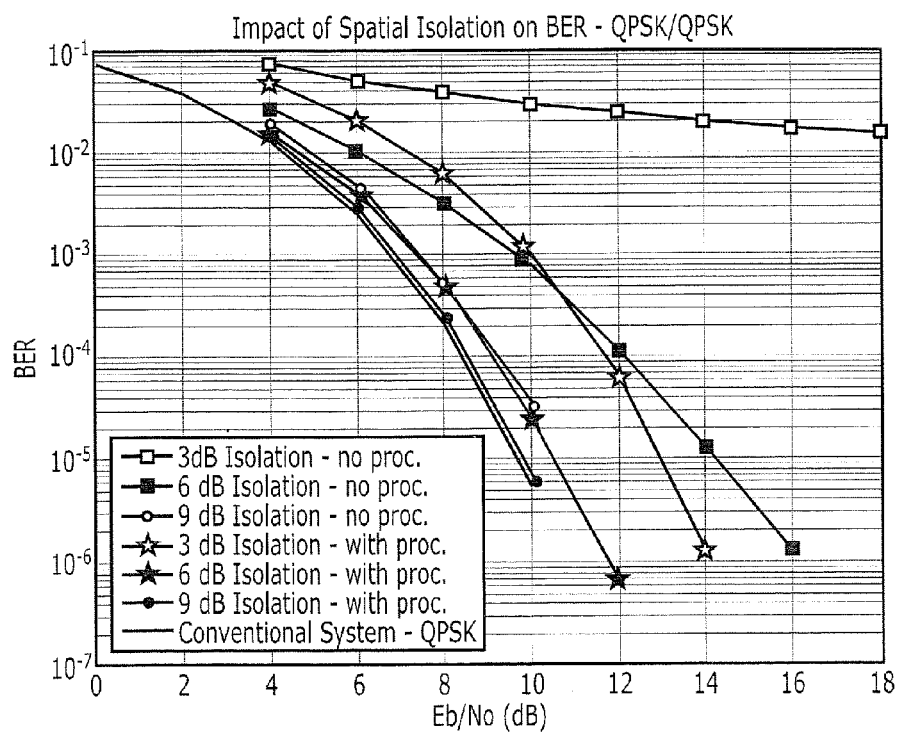
FIG. 4b  Return Link - BER for the Black or the red signals with antenna spatial isolation between the two (N = 256, QPSK/QPSK)

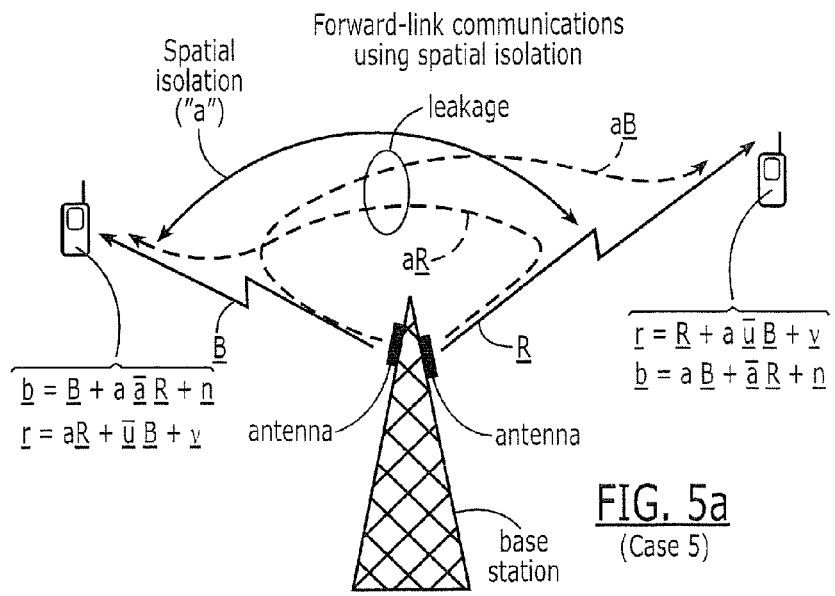
FIG. 5a (Case 5)
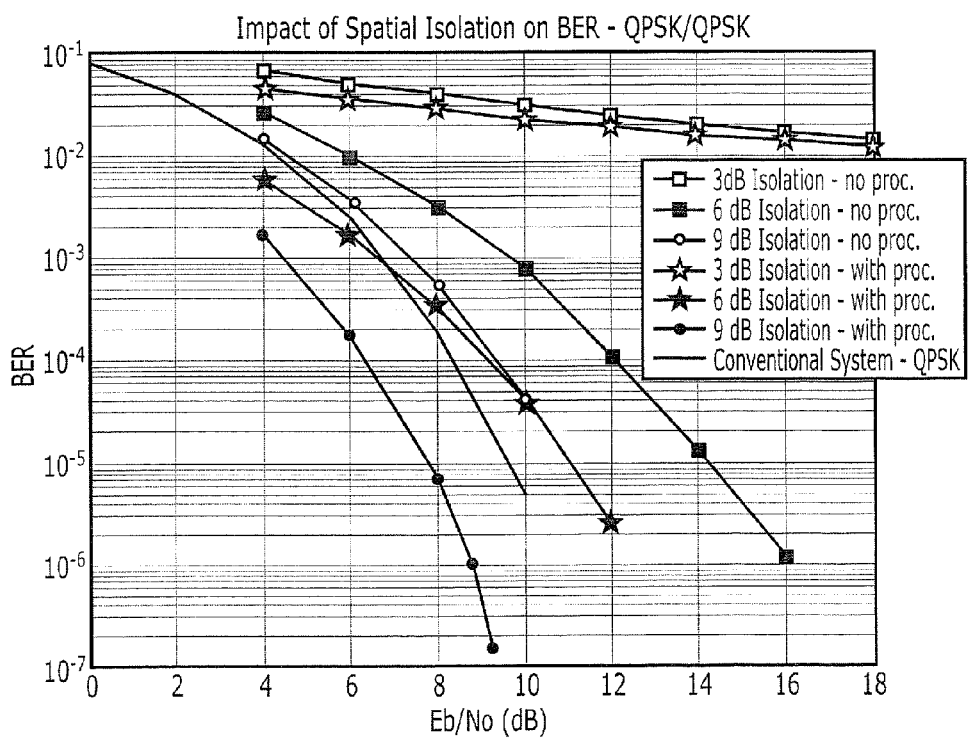
FIG. 5b   Forward Link - BER for the Black signal with antenna spatial isolation between the black and the red (N = 256, QPSK/QPSK)

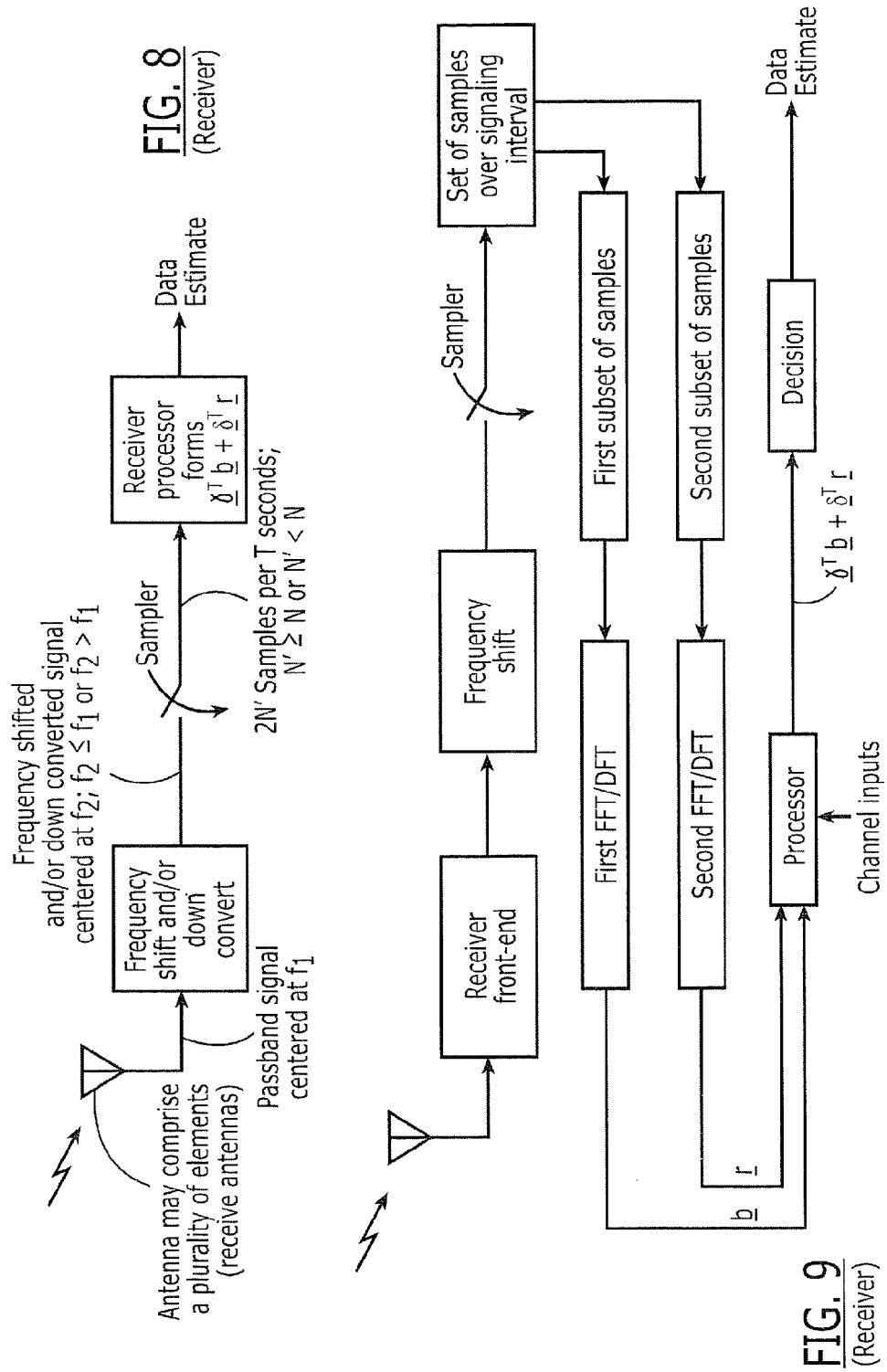

(Receiver)

US 8,462,860 B2

INCREASED CAPACITY COMMUNICATIONS SYSTEMS, METHODS AND/OR DEVICES

CROSS-REFERENCE TO RELATED APPLICATIONS

This application claims the benefit of Provisional Application Ser. No. 61/078,598, entitled Increased Capacity Communications Systems, Devices and/or Methods, filed Jul. 7, 2008; Provisional Application Ser. No. 61/100,142, entitled Additional Systems, Devices and/or methods for Increasing Capacity of Communications Systems, filed Sep. 25, 2008; Provisional Application Ser. No. 61/116,856, entitled Further Systems, Devices and/or Methods for Increasing Capacity of Communications Systems, filed Nov. 21, 2008; Provisional Application Ser. No. 61/117,437, entitled Equalizer-Based Increased Capacity OFDM Systems, Methods and Devices, filed Nov. 24, 2008; Provisional Application Ser. No. 61/119,593, entitled Equalizer-Based Increased Capacity OFDM Systems, Methods and Devices, filed Dec. 3, 2008; Provisional Application Ser. No. 61/155,264, entitled Compact OFDM Systems, Devices and/or Methods, filed Feb. 25, 2009; and Provisional Application Ser. No. 61/163,119, entitled Additional Compact OFDM/OFDMA Systems, Devices and/or Methods, filed Mar. 25, 2009, all of which are assigned to the assignee of the present invention, the disclosures of all of which are hereby incorporated herein by reference in their entirety as if set forth fully herein.

BACKGROUND OF THE INVENTION

This invention relates to wireless and wireline communications systems, methods and/or devices and more particularly to wireless and wireline communications systems, methods and/or devices that transmit/receive information using an Orthogonal Frequency Division Multiplexed ("OFDM") and/or Orthogonal Frequency Division Multiple Access ("OFDMA") protocol.

In communications systems, wireline and/or wireless, a primary design objective is to reduce or minimize noise and/or interference, while increasing or maximizing desired signal strength, in order to increase or maximize system capacity. Much research has been conducted, and continues to be conducted, towards this objective. It is well known, for example, that a communications receiver that is based upon "matched filter" principles is optimum in terms of maximally rejecting noise while maximally acquiring a desired signal. Further examples relate to the many receiver and/or transmitter "equalization/cancellation" techniques that have been developed to combat effects of non-ideal channels and/or system devices that generate linear and/or non-linear Inter-Symbol Interference ("ISI"), Adjacent Channel Interference ("ACI") and/or Cross Polarization Interference ("CPI").

At the current time, it appears that OFDM/OFDMA-based systems will proliferate as is evident by developments in the standardization and deployment of OFDM/OFDMA-based systems, such as, for example, Wi-Fi, Wi-MAX and LTE.

SUMMARY OF THE INVENTION

Some embodiments of the present invention provide for receiving a signal comprising N first sub-carriers, wherein $N \geq 2$; generating 2N' samples of the signal, wherein $N' \geq N$; performing a first transformation on a first sub-set of the 2N' samples; performing a second transformation on a second sub-set of the 2N' samples; and combining an element of the first transformation with an element of the second transformation.

In some embodiments, the N first sub-carriers are orthogonal therebetween.

In further embodiments of the invention, the signal further comprises M second sub-carriers; $M \geq 0$; wherein the M second sub-carriers are superimposed on the N first sub-carriers over a frequency interval of bandwidth B Hz that is substantially occupied by the N first sub-carriers and over a time interval of T seconds in duration over which the N first sub-carriers are defined. The M second sub-carriers may be orthogonal therebetween and at least one of the M second sub-carriers may not be orthogonal to at least one of the N first sub-carriers.

The 2N' samples may comprise 2N' time-domain samples and at least one of the 2N' time-domain samples may comprise a complex value. In some embodiments, the signal comprises a bandwidth of B Hz, wherein $B \geq N/T$ and wherein T denotes a signaling interval over which the N first sub-carriers are defined.

In some embodiments of the invention, receiving a signal comprises receiving a passband signal wherein B is centered at a (carrier) frequency $f_1$ and wherein the passband signal is frequency shifted from the (carrier) frequency $f_1$ to a frequency $f_2$ prior to the generating 2N' samples of the signal. In accordance with some embodiments of the invention, $f_2 = B/2$, $f_2 = 0$, $f_2 < f_1$ or $f_2 \geq f_1$.

Further to the above, a spacing between two adjacent sub-carriers of the N first sub-carriers may be 1/T Hz, a spacing between two adjacent sub-carriers of the M second sub-carriers may be 1/T Hz and a spacing between a first sub-carrier of the N first sub-carriers and a sub-carrier of the M second sub-carriers that is adjacent to the first sub-carrier of the N first sub-carriers may be ½T Hz.

In additional embodiments, the first sub-set of the 2N' samples comprises a first set of N" samples and the second sub-set of the 2N' samples comprises a second set of N'" samples; wherein $1 \leq N'' \leq 2N'$ and $1 \leq N''' \leq 2N'$. In other embodiments, $N'' = N''' = N'$, a spacing between two adjacent samples of the first set of N" samples is T/N' seconds, a spacing between two adjacent samples of the second set of N'" samples is T/N' seconds and a spacing between a first sample of the first set of N" samples and a sample of the second set of N'" samples that is adjacent to the first sample of the first set of N" samples is T/2N' seconds.

In some embodiments, the first transformation and the second transformation each comprises a time-domain to frequency-domain transformation. The time-domain may be a discrete time-domain, the frequency-domain may be a discrete frequency-domain and the time-domain to frequency-domain transformation may comprise a Discrete Fourier Transform and/or a Fast Fourier Transform.

Some embodiments further comprise modifying the element of the first transformation and/or modifying the element of the second transformation prior to the combining. In some embodiments, combining comprises: forming $\gamma^T b + \delta^T r$, wherein b comprises the element of the first transformation, r comprises the element of the second transformation, $\gamma^T b$ comprises modifying the element of the first transformation, $\delta^T r$ comprises modifying the element of the second transformation and wherein the superscript T denotes vector (or matrix) transpose and/or conjugate transpose, as appropriate.

Yet further embodiments comprise calculating $\gamma$ and $\delta$ such that a statistical expectation, such as, for example, $E[|\gamma^T b + \delta^T r - B_k|^2]$ is minimized; wherein $E[\bullet]$ denotes statistical expectation, $|\bullet|$ denotes magnitude and $B_k$ denotes a data element that is associated with a $k^{th}$ sub-carrier; k=1, 2, ..., N. In some embodiments, calculating comprises calculating for at least one value of k; k=1, 2, ..., N. Some embodiments further comprise using $\gamma^T b + \delta^T r$ to determine an estimate of $B_k$ for at least one value of k, wherein $\gamma$ and $\delta$ may depend on k.

Further to the above, communicating information may be provided by forming a first Orthogonal Frequency Division Multiplexed ("OFDM") and/or a first Orthogonal Frequency Division Multiple Access ("OFDMA") carrier comprising a first number of sub-carriers that are orthogonal therebetween; forming a second OFDM and/or OFDMA carrier comprising a second number of subcarriers that are orthogonal therebetween but may not be orthogonal to the first number of sub-carriers; superimposing in time and in frequency, the first OFDM/OFDMA carrier with second OFDM/OFDMA carrier such as to generate a level of interference therebetween, that may be substantial interference therebetween; and transmitting the superimposed first and second OFDM/OFDMA carriers. Analogous methods, systems and/or devices may also be provided.

Further embodiments of systems and/or devices may be provided according to the present invention. For example, a communications receiver may be provided comprising a processor that is configured to: receive a signal comprising N first sub-carriers, wherein N≧2; generate 2N' samples of the signal, wherein N'≧N; perform a first transformation on a first sub-set of the 2N' samples; perform a second transformation on a second sub-set of the 2N' samples; and combine an element of the first transformation with an element of the second transformation.

Additional methods/systems/devices may be provided according to additional embodiments of the present invention wherein first and second portions of an OFDM carrier are formed by a transmitter, via respective first and second operations. The first and second operations may be first and second Discrete Fourier Transforms ("DFTs"), Fast Fourier Transforms ("FFTs"), Inverse Discrete Fourier Transforms ("IDFTs") and/or Inverse Fast Fourier Transforms ("IFFTs").

The first and second portions of the OFDM carrier may be kept separate, may be amplified by respective different/separate first and second power amplifiers of the transmitter and may then be combined/superimposed, after high-power amplification, prior to transmission over a propagation medium. In other embodiments, the first and second portions of the OFDM carrier are kept separate even after the amplification (are not combined) and are used to excite respective first and second different/separate propagation media and/or channels, such as, for example, first and second different wireline propagation media (different first and second twisted-pair, different first and second coaxial cables and/or different first and second fiber-optical propagation media, etc.) and/or different first and second wireless propagation media via respective first and second antennas (or antenna elements).

BRIEF DESCRIPTION OF THE DRAWINGS

FIG. 4a illustrates systems/methods/devices of return-link communications according to embodiments of the invention that use a spatial discrimination between two or more receiver/transmitter antennas.

FIG. 4b provides BER curves that are associated with methods, systems and/or devices that are based upon FIG. 4a.

FIG. 5a illustrates systems/methods/devices of forward-link communications according to embodiments of the invention that use a spatial discrimination between two or more receiver/transmitter antennas.

FIG. 5b provides BER curves that are associated with methods, systems and/or devices that are based upon FIG. 5a.

FIGS. 8, 9, 10 and 11 illustrate receiver methods/systems/devices according to various embodiments of the invention.

DETAILED DESCRIPTION

Figure 1:
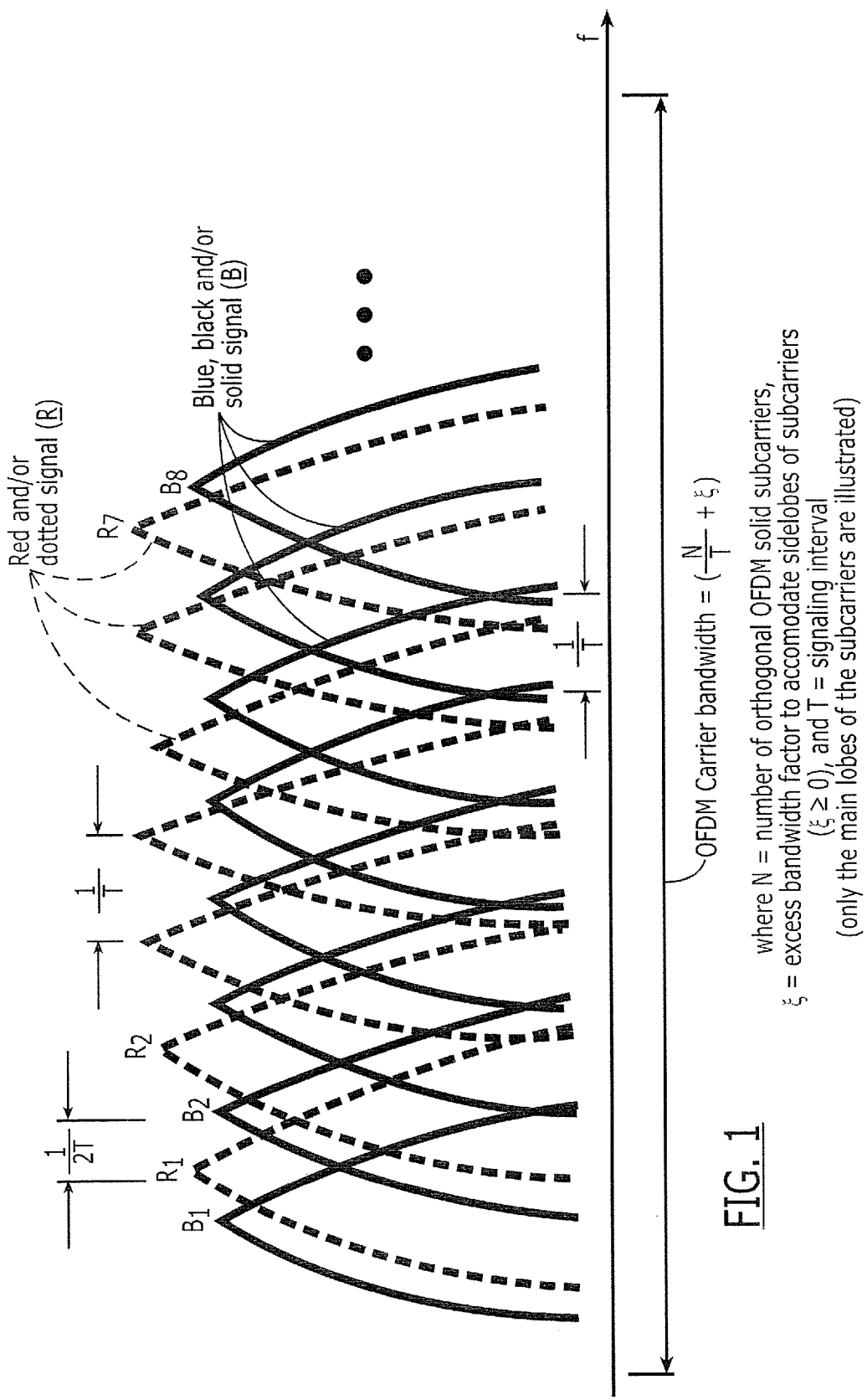
FIG. 1 illustrates a superposition of first and second OFDM/OFDMA carriers according to various embodiments of the invention.

The present invention now will be described with reference to the accompanying drawings. This invention may, however, be embodied in many different forms and should not be construed as limited to the embodiments set forth herein. Rather, these embodiments are provided to further convey the scope of the invention to those skilled in the art. It will be understood that two or more embodiments of the present invention may be combined in whole or in part to form one or more additional embodiments.

It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a," "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although terms such as first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items.

The symbol "/" is also used as a shorthand notation for "and/or". Moreover, as used herein, the term "subset" shall be interpreted to mean a set (a first set) that contains at least one but less than all members/elements of another set (a second set). That is, if S is a subset of SS, then S contains at least one but less than all elements of SS. More specifically, if, for example, SS={$s_1, s_2, s_3, s_4, s_5$}, then S={$s_2$}, for example, is a subset of SS. Also, S={$s_1, s_3, s_5$} is a subset of SS, etc.

As used herein, the term "transmitter" and/or "receiver" include(s) transmitters/receivers of cellular and/or satellite terminals with or without a multi-line display; Personal Communications System ("PCS") terminals that may include data processing, facsimile and/or data communications capabilities; Personal Digital Assistants ("PDA") that can include a radio frequency transceiver and/or a pager, Internet/Intranet access, Web browser, organizer, calendar and/or a Global Positioning System ("GPS") receiver; and/or conventional laptop and/or palmtop computers or other appliances, which include a radio frequency transceiver. As used herein, the term "transmitter" and/or "receiver" also include(s) any other radiating device, equipment and/or source that may have time-varying and/or fixed geographic coordinates and/or may be portable, transportable, installed in a vehicle (aeronautical, maritime, or land-based) and/or situated/configured to operate locally and/or in a distributed fashion at any location(s) on earth, in one or more vehicles (land-mobile, maritime and/or aeronautical) and/or in space. A transmitter and/or receiver also may be referred to herein as a "terminal," "wireless terminal," "mobile device" and/or "end-user device." In addition, it will be understood that a transmitter and/or receiver may be configured to operate in a wireless and/or a wired (wireline, cable, fiber, etc.) mode.

Various embodiments of the present invention are based upon the realization that a time-domain to frequency-domain transformation, such as, for example, a Discrete Fourier Transform ("DFT") and/or a Fast Fourier Transform ("FFT"), provides information that is associated with a specific number of frequency-domain points only. For example, an N-point FFT provides information that is associated with precisely N frequency-domain points on a frequency axis; wherein N may be equal to, for example, 2, 4, 8, 16, 32, 64, etc. There may be, however, information that is associated with additional frequency-domain points on the frequency axis, other than the N-points. The information that is associated with the additional frequency-domain points on the frequency axis, other than the N-points, may include what may be termed "interference," but even interference contains energy that may be useful energy, and this interference may lend itself to mitigation/equalization, particularly when a processor is configured to operate on the interference and on other signals that have given rise to and/or are related to the interference. Accordingly, a communications receiver may be configured to observe information associated with, for example, a received Orthogonal Frequency Division Multiplexed ("OFDM") carrier, comprising N sub-carriers, by subjecting a time-domain representation of the received OFDM carrier to an N-point FFT, as is conventionally done, providing an N-dimensional vector of values that is associated with an N-dimensional data vector that is associated with the N sub-carriers of the OFDM carrier.

The time-domain representation of the received OFDM carrier, however, may additionally be subjected to a second N-point FFT (or to a second M-point FFT, wherein M may be greater than, or less than, N) to provide frequency-domain information associated with, for example, N (or M) "transition," "interstitial" or "in-between" frequencies on the frequency axis. The transition, interstitial or in-between frequencies may be selected/located (on the frequency axis) between orthogonally disposed OFDM sub-carriers. Accordingly, the second FFT may provide information containing interference from a plurality of side-lobes of the orthogonally disposed OFDM sub-carriers. However, information containing interference may still be valuable. Just like in time-domain equalization, information containing interference, such as, for example, Inter-Symbol Interference ("ISI"), may be used advantageously to improve communications performance, frequency-domain information, even though it may contain interference, such as, for example, frequency-domain ISI, may also be used advantageously to improve communications performance.

According to embodiments of the present invention, first and second signals may be transmitted by a transmitter. The first signal may be referred to herein as the blue, black and/or solid signal, whereas the second signal may be referred to herein as the red and/or dotted signal. In some embodiments, the first and second signals represent respective first and second OFDM/OFDMA carriers, wherein each one of the first and second OFDM/OFDMA carriers may comprise a plurality of subcarriers, as is illustrated in FIG. 1. (It will be understood that in FIG. 1 even though only three subcarriers are pointed to as being "dotted" and "solid," respectively, this is done to minimize clutter in the Figure. All subcarriers that are drawn in solid traces may belong to the "solid" signal and all subcarriers that are drawn in dotted traces may belong to the "dotted" signal.) The first OFDM/OFDMA carrier may comprise a first number, N, of subcarriers that may be orthogonal therebetween (i.e., any two different subcarriers of the first number N of subcarriers may be orthogonal therebetween) and the second OFDM/OFDMA carrier may comprise a second number, M, of subcarriers that may be orthogonal therebetween (i.e., any two different subcarriers of the second number M of subcarriers may be orthogonal therebetween) wherein M may be equal to N, in some embodiments, or M may be different from N in other embodiments. The first number N of subcarriers may not be orthogonal to the second number M of subcarriers (i.e., a subcarrier of the first number N of subcarriers may not be orthogonal to a subcarrier of the second number M of subcarriers. In yet other embodiments, the first and/or second signal may represent a signal that is not based upon OFDM/OFDMA; such as, for example, a Nyquist signal or a half-Nyquist signal.

Responsive to the first and second signals having been transmitted by a transmitter, a receiver may be configured to process respective first and second signals that, according to some embodiments of the present invention, may represent respective first and second frequency-domain signals (or frequency-domain observables), that may be expressed as $b=B+\bar{a}R+n$ and $r=R+\bar{u}B+v$, respectively. The first and second frequency-domain observables comprise respective desired signal components, B and R, respective components reflecting interference, $\bar{a}R$ and $\bar{u}B$, and respective components reflecting noise, n and v. The quantities b, r, B, R, n and v may represent vector quantities and the quantities $\bar{a}$ and $\bar{u}$ may represent matrix quantities. A signal processor of the receiver may be configured to process the first and/or second frequency-domain observables to determine information (data) associated with the first and/or second transmitted signals.

In some embodiments according to the present invention, a receiver may be configured to acquire a minimum of 2N time-domain samples of a received OFDM/OFDMA signal over a signaling interval, "T," thereof (wherein N denotes an FFT/DFT size and/or a number of subcarriers associated with the OFDM/OFDMA signal) and using a first subset of the 2N time-domain samples, that may be a subset comprising N first samples of the 2N time-domain samples, wherein, for example, the N first samples comprise even indexed samples, of the 2N time-domain samples, to form a first FFT/DFT (a conventional FFT/DFT at frequencies k/T); and using a second subset of the 2N time-domain samples, that may be a subset comprising N second samples of the 2N time-domain samples, wherein, for example, the N second samples comprise odd indexed samples, of the 2N time-domain samples, to form a second FFT/DFT at the "in-between" (i.e., at the interstitial or transition) frequencies of $(2k+1)/2T=(k+\frac{1}{2})/T$; $k=1, 2, \ldots, N$; wherein T denotes the signaling interval. The first FFT/DFT may be used to provide a first N-dimensional vector "b" while the second FFT/DFT may be used to provide a second vector "r," that may be a second N-dimensional vector r. The two vectors, b and r, may then be combined in, for example, a least mean-squared-error sense. It will be understood that, in some embodiments, instead of using the even indexed samples discussed above to form/define b, the odd indexed samples may be used, and instead of using the odd indexed samples discussed above to form/define r, the even indexed samples may be used. Other combinations/subsets of the minimum 2N time-domain samples may also be used, in further embodiments, to form/define b and r.

In other embodiments of the present invention, instead of the above or in combination with the above, a 2N-point DFT/FFT may be performed on the 2N time-domain samples and a first subset of points of the 2N-point DFT/FFT, that may be a first subset of N points of the 2N-point DFT/FFT, comprising, for example, a subset of N even indexed points of the 2N-point DFT/FFT, may be used to define the vector b while a second subset of points of the 2N-point DFT/FFT, that may be a second subset of N points of the 2N-point DFT/FFT, comprising, for example, a subset of N odd indexed points of the 2N-point DFT/FFT, may be used to define the vector r. It will be understood that, in some embodiments, instead of using the even indexed samples/points discussed above to form/define b, the odd indexed samples/points may be used, and instead of using the odd indexed samples/points discussed above to form/define r, the even indexed samples/points may be used. Other sample/point combinations may also be used, in further embodiments, to form/define b and r.

In some embodiments of the invention, prior to acquiring the minimum of 2N time-domain samples discussed above, a received passband OFDM/OFDMA carrier, whose frequency content and/or whose allocated frequency channel may be centered at a frequency $f_c$, may be shifted down (i.e., translated in frequency) not by $f_c$ (as is conventionally done) but instead, may be shifted down by $f_c-N/2T$ (or by any other value). This may be necessary, in some embodiments, to provide uncorrelated and/or independent noise vectors n and v.

In some embodiments of the present invention, a signal processor may be configured to jointly process the first and second frequency domain observables b, r. In other embodiments, the signal processor may be configured to perform first and second signal processing operations sequentially (e.g., over respective first and second substantially non-overlapping time intervals or over respective first and second time intervals that overlap therebetween at least partially) in order to determine information (data) associated with the first and/or second transmitted signal vectors B, R.

The signal processor may be configured to form, for example, $\gamma^T b$ and $\delta^T r$ and to combine $\gamma^T b$ with $\delta^T r$ to form $\gamma^T b + \delta^T r$; wherein the superscript T denotes vector transpose (or matrix transpose) or conjugate transpose, as appropriate, and wherein $\gamma$ and $\delta$ may, according to some embodiments, denote vector quantities that may be complex-valued. The signal processor may be configured to calculate $\gamma$ and $\delta$ such that a statistical expectation, for example, $E[|\gamma^T b + \delta^T r - B_k|^2]$, is minimized; wherein $E[\bullet]$ denotes statistical expectation, $|\bullet|$ denotes magnitude and $B_k$ denotes a data element (complex, imaginary or real-valued) that is associated with a $k^{th}$ sub-carrier that may represent a $k^{th}$ element of B; $k=1, 2, \ldots, N$.

In some embodiments of the present invention, the signal processor may be configured to reduce and/or minimize (or substantially reduce and/or minimize) a mean-squared error quantity, performance index and/or cost function wherein the first and second transmitted signal vectors, B, R, are substantially independent therebetween (this may be referred to herein as "Case 1").

In some embodiments relating to Case 1, the values of $\gamma$ and $\delta$ that minimize $E[|\gamma^T b + \delta^T r - B_k|^2]$ may satisfy the following equations:

$$\overline{A}\gamma + \overline{E}\delta = 1_k; \text{ and}$$

$$\overline{O}\gamma + \overline{U}\delta = \overline{u}1_k;$$

wherein
$\overline{A} = (\sigma_R^2/\sigma_B^2)\overline{a}\overline{a}^T + (1+\sigma_n^2/\sigma_B^2)\overline{I}$;
$\overline{E} = \overline{u}^T + (\sigma_R^2/\sigma_B^2)\overline{a}$;
$\overline{O} = \overline{u} + (\sigma_R^2/\sigma_B^2)\overline{a}^T$; and
$\overline{U} = \overline{u}\overline{u}^T + (\sigma_Y^2/\sigma_B^2 + \sigma_v^2/\sigma_B^2)\overline{I}$;

In the above equations, $1_k$ denotes a column vector that includes all zero entries except for the $k^{th}$ entry thereof which is unity, and all quantities with a bar on top and a bar below represent matrices whose elements may be complex-valued, real, and/or imaginary. Further to the above, elements of the matrix $\overline{u}$ represent levels of interference (leakage) from the blue sub-carriers, B, to the red sub-carriers R, $\overline{I}$ denotes an identity matrix, $\sigma_n^2$ denotes variance of a component/element of n, $\sigma_R^2$ denotes variance of a component/element of R, $\sigma_B^2$ denotes variance of a component/element of B, elements of the matrix $\overline{a}$ represent levels of interference (leakage) from the red sub-carriers, R, to the blue sub-carriers B; and $\sigma_v^2$ denotes variance of a component/element of v.

It will be understood that when the symbol "T" is used as a superscript, it will be interpreted to denote vector transpose, matrix transpose and/or conjugate transpose (of a vector or a matrix, as appropriate), not only in the above equations but throughout this specification, unless otherwise specified. It will further be understood that the symbol "T" may also be used to denote a time interval (e.g., a signaling interval) when it is not used as a superscript. Unless otherwise specified, when "T" is used in any way other than a superscript, it will be interpreted to represent a time interval.

In deriving the above equations, the quantities B, R, n and v may be assumed to be statistically independent therebetween and each one of the quantities B, R, n and v may be assumed to be of zero mean. In other embodiments, however, a statistical dependence (a non-zero correlation and/or non-zero covariance matrix) may be assumed between any two of the stated vector quantities and equations corresponding to such assumptions may be derived, as those skilled in the art will appreciate.

Figure 2:
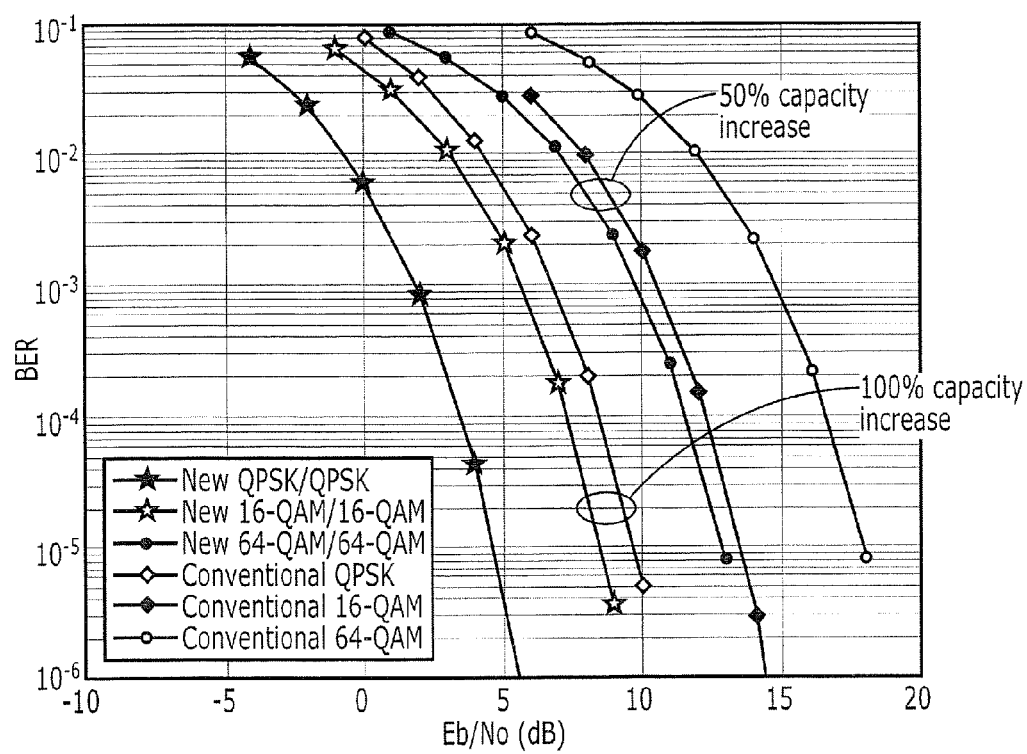
FIG. 2 provides Bit Error Rate ("BER") curves according to embodiments of the invention.

In other embodiments of the present invention, a signal processor may be configured to reduce and/or minimize (or substantially reduce and/or minimize) a mean-squared error quantity, performance index and/or cost function wherein the first and second transmitted signal vectors B, R are substantially dependent therebetween (this may be referred to herein as "Case 2"). In some embodiments, the first and second transmitted signal vectors (B, R) may comprise substantially identical information (data) therebetween (e.g., B=R). Computer simulation results associated with Case 2, wherein B=R, show that a channel capacity measure may be increased by 100% in some embodiments of the invention, and by 50% in other embodiments of the invention, as is illustrated in FIG. 2. This may be a significant finding.

In some embodiments relating to Case 2, the values of $\gamma$ and $\delta$ that minimize $E[|\gamma^T b + \delta^T r - B_k|^2]$ may satisfy the following equations:

$$\overline{\overline{A}}'\gamma + \overline{\overline{E}}'\delta = \overline{a}'1_k; \text{ and}$$

$$\overline{\overline{O}}'\gamma + \overline{\overline{U}}'\delta = \overline{u}'1_k;$$

wherein
$\overline{\overline{A}}' = \overline{a}(\overline{a}')^T + (\sigma_n^2/\sigma_B^2)\overline{\overline{I}};$
$\overline{\overline{E}}' = \overline{a}'(\overline{u}')^T;$
$\overline{\overline{O}}' = \overline{u}(\overline{a}')^T;$ and
$\overline{\overline{U}}' = \overline{u}'(\overline{u}')^T + (\sigma_v^2/\sigma_B^2)\overline{\overline{I}};$ wherein, as before, $1_k$ denotes a column vector with all zero entries except for the $k^{th}$ entry thereof which is unity, and all quantities with a bar on top and a bar below represent matrices whose elements may be complex-valued, real-valued and/or imaginary-valued. Furthermore, $\overline{a}' = \overline{\overline{I}} + \overline{a}$ and $\overline{u}' = \overline{\overline{I}} + \overline{u};$ wherein $\overline{a}$ and $\overline{u}$ are as defined above relative to Case 1 with the elements of matrix $\overline{a}$ representing levels of interference (i.e., leakage) from the red sub-carriers, R, to the blue sub-carriers, and with the elements of the matrix $\overline{u}$ representing levels of interference (leakage) from the blue sub-carriers, B, to the red sub-carriers. Also, as defined earlier in connection with Case 1 above, $\sigma_n^2$ denotes variance of a component of n, $\sigma_v^2$ denotes variance of a component of v, $\sigma_B^2$ denotes variance of a component of B and $\overline{\overline{I}}$ denotes an identity matrix. In deriving the above equations, B, n and v have been assumed to be statistically independent therebetween and each of zero mean. In other embodiments, however, a statistical dependence (a non-zero correlation and/or non-zero covariance matrix) may be assumed between any two of the stated vector quantities and equations corresponding to such assumptions may be derived, as those skilled in the art will appreciate.

It may be observed that in embodiments relating to Case 2, the signal processor may be viewed as performing voltage addition of first and second signals received, responsive to the first and second signals that are transmitted comprising the substantially identical (e.g., B=R) information (data) therebetween. It may also be observed that in accordance with embodiments relating to Case 2, the signal processor may be viewed as providing increased desired signal power/energy by making use (and taking advantage) of signal samples at frequencies that conventional receivers neglect. Upon reflection, an analogy may be drawn between the signal processor described herein with respect to Case 2 (and Case 3, as discussed below herein) and a time-domain equalizer or a time-domain rake receiver. As is the case with a time-domain equalizer and/or a time-domain rake receiver, coherently combining desired signal components that are dispersed in time, the signal processor used herein combines coherently desired signal components that may be viewed as being dispersed in frequency.

Figure 3:
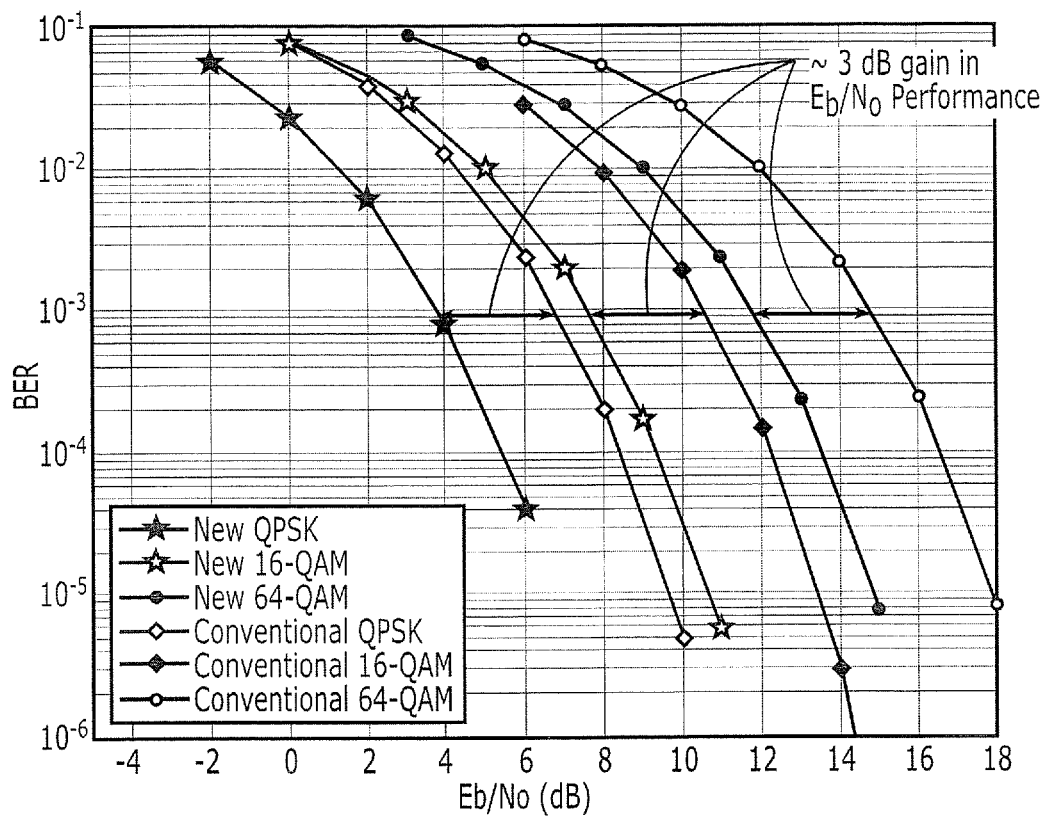
FIG. 3 provides further BER curves according to further embodiments of the invention.

In some embodiments of the present invention that are associated with what may be referred to herein as Case 3, only one of the first and second signals (B, R) is transmitted (for example, only B is transmitted) and a receiver processor may be configured, in some embodiments, substantially as in Case 1 with R→0, (i.e., with each element/component of the vector R set to zero) to process the receiver observables that, in some embodiments, may be b=B+n and r=$\overline{u}$B+v. Computer simulation results associated with Case 3 (see FIG. 3), show that a power efficiency measure (e.g., $E_b/N_0$) may improve by up to 3 dB over that provided by conventional OFDM/OFDMA systems, devices and/or methods.

As stated earlier, and as may be appreciated by those skilled in the art, according to various embodiments of the present invention, the receiver processor may be envisioned as functioning as a frequency-domain equalizer (that may be viewed as a frequency-domain fractionally-spaced equalizer) and/or as a frequency-domain rake receiver that collects a maximum (or near maximum) available/desired signal energy to increase/maximize capacity and/or power efficiency of communications. This may be achieved, in some embodiments, by utilizing energy of a plurality of frequency-domain points whose respective "noise" components are, at least partially, uncorrelated and/or independent therebetween but whose "desired" signal components comprise a level of correlation/dependence therebetween.

It will be understood that any embodiment or combination/sub-combination of embodiments described herein and/or in any of the U.S. Provisional Applications cited herein may be used to provide wireless and/or wireline systems, devices and/or methods. It will also be understood that even though embodiments are presented herein in terms of a receiver processor reducing/minimizing a mean-squared error quantity, performance index and/or cost function (i.e., a recursive and/or non-recursive receiver processor that yields a Least Mean Squared Error ("LMSE")), any other quantity, performance index, algorithm (recursive and/or non-recursive) and/or cost function other than LMSE (such as, for example, zero-forcing, least squares, maximum likelihood, maximum a posteriori probability, etc.) may be used in lieu of LMSE or in conjunction with LMSE. Recursive and/or non-recursive algorithms/receiver processors may also be used whether embodied as software, hardware and/or firmware. It will also be understood that the principles described herein are applicable to any wireline and/or wireless transmitter/receiver system, device and/or method, including radar transmitter/receiver systems, devices and/or methods. Furthermore, it will be understood that according with Multiple Input Multiple Output ("MIMO") embodiments of the invention, the solid signal may, at least partially, be transmitted from a first antenna and the dotted signal may, at least partially, be transmitted from a second antenna.

Further embodiments may be provided as is illustrated by FIG. 4a. These embodiments may be referred to herein as "Case 4." In these embodiments, a spatial isolation between first and second antennas of a base station (or any other device) is used (relied upon) to attenuate (suppress) matrices $\overline{a}$ and $\overline{u}$ by an amount "a" (|a|<1). A receiver processor as in embodiments relating to Case 1 may be used to process received observable vectors b and r (expressed as b=B+a$\overline{a}$R+n; and r=a$\overline{u}$B+v) to derive information (data) associated with transmitted respective first and second end-user device signal vectors B and R, as is shown in FIG. 4a. Computer simulation results are presented in FIG. 4b. Configurations/embodiments of providing return-link communications as illustrated by FIG. 4a, advantageously allow first and second end-user devices to send/transmit return-link information (data) to a base station (and/or any other system element) using respective first (B, blue, or solid) and second (R, red, or dotted) carriers/signals that are transmitted, by the respective first and second end-user devices, staggered in frequency therebetween but substantially co-channel, using substantially the same resources of an available frequency space, channel and/or bandwidth, as is illustrated in FIG. 1, thus increasing a spectral efficiency measure of the return-link communications. In some embodiments, the staggering in frequency may be equal (or approximately equal) to ½T (i.e., one half of the inverse of a signaling interval as is illustrated in FIG. 1). In other embodiments, the staggering in frequency may be equal to one or more other values and/or may vary across the available frequency space.

Additional embodiments of the present invention may be provided as is illustrated in FIG. 5a. In these additional embodiments, which may be referred to herein as relating to "Case 5," a spatial isolation "a" between first and second antennas of a base station and/or first and second antennas of respective first and second end-user devices is used to provide forward-link communications from the base station to the first and second end-user devices, as is illustrated in FIG. 5a. A receiver processor (at each end-user device), that may, according to some embodiments, be configured substantially as in Case 1, may be used to process received observable vectors b and r (as received by each end-user device) to derive information (data) associated with transmitted signal vectors B and R, as is shown in FIG. 5a. Computer simulation results are presented in FIG. 5b. Configurations/embodiments of providing forward-link communications as is illustrated in FIG. 5a, advantageously can allow first and second end-user devices to receive information (data) from a base station using respective first (B, blue, or solid) and second (R, red, or dotted) carriers that are staggered in frequency therebetween and transmitted by the base station substantially co-channel, using substantially the same resources of an available frequency space/channel/bandwidth, as is illustrated in FIG. 1, thus increasing a spectral efficiency measure of the forward-link communications. In some embodiments, the staggering in frequency may be equal (or approximately equal) to ½T (i.e., one half of the inverse of a signaling interval as is illustrated in FIG. 1). In other embodiments, the staggering in frequency may be equal to one or more other values and/or may vary across the available frequency space.

Still further embodiments of the present invention may be provided. These still further embodiments may be referred to herein as relating to "Case 6." In accordance with these still further embodiments, an intentionally-introduced attenuation factor ("a") may be used to simulate a spatial isolation that may not be present because either first and second end-user devices are proximate to one another or because the first and second signals (i.e., the blue/solid and red/dotted signals) are transmitted by a base station in the same direction and are both aimed at a given (same) end-user device. Accordingly, the base station may transmit B and aR (instead of B and R); wherein |a|<1.

For a first embodiment relating to Case 6, a receiver processor at an end-user device may be configured substantially as in Case 1 and may first be used to process the received observable vectors b=B+a$\bar{a}$R+n and r=aR+$\bar{u}$B+v to derive information (data) associated with transmitted signal vectors B. Once an estimate of B has been derived, it may be used to perform a cancellation of components related to B (that is, cancellation of the term $\bar{u}$B in r, without noise enhancement of r) thus deriving an estimate of R. Thus, in embodiments of the invention relating to Case 6, a two-stage (or a multi-stage) sequential receiver processor may be used.

For a second embodiment relating to Case 6, a receiver processor at a first end-user device, that may, according to some embodiments, be configured substantially as in Case 1, may first be used to process the received observable vectors b and r to derive information (data) associated with transmitted signal vector B. Once an estimate of B has been derived, the estimate of B may be relayed by the first end-user device to a second end-user device via a link (that may be a short-range link that is established directly between the first and second end-user devices) and the estimate of B may be used by the second end-user device to perform cancellation of components related to transmitted signal vector B (without noise enhancement) thus deriving an estimate of R. Thus, in embodiments of the invention relating to Case 6, a sequential receiver processor may be used wherein the sequential receiver processor may be distributed between the first and the second end-user devices and wherein a processor component that is associated with the second end-user device receives a first data estimate from the first end-user device and uses the received first data estimate from the first end-user device to derive a second data estimate that is intended for the second end-user device; wherein the first data estimate is intended for the first end-user device but is sent by the first end-user device to the second end-user device to aid the second end-user device to derive the second data estimate that is intended for the second end-user device.

Alternatively or in combination with the above, the sequential receiver processor may be included in its entirety in the second and/or in the first end-user device so that, in some embodiments, the second end-user device may not have to rely upon receiving the first data estimate from the first end-user device. Instead, the second end-user device may itself derive the first data estimate (even though the first data and/or any estimate thereof is not intended for the second end-user device) and then, the second end-user device may use the first data estimate that it has derived to derive the second data estimate (that is intended for the second end-user device). In some embodiments, the second end-user device may be configured to derive the first data estimate (via signal processing that is not associated with the first end-user device; via signal processing that is at the second end-user device) and to also receive the first data estimate from the first end-user device (as derived via signal processing that is associated with the first end-user device and is at the first end-user device). It will be understood that the term first end-user device may, in some embodiments, comprise a plurality of first end-user devices (that may be networked therebetween and/or may be configured to communicate therebetween directly or via intervening elements) and/or the term second end-user device may, in some embodiments, comprise a plurality of second end-user devices (that may be networked therebetween and/or may be configured to communicate therebetween directly or via intervening elements).

Accordingly, providing forward-link communications using embodiments associated with Case 6, may advantageously allow first and/or second end-user devices to receive information (data) from a base station using first (B, blue, or solid) and second (R, red, or dotted) carriers that are staggered in frequency therebetween and transmitted by the same base station substantially co-channel, using substantially the same resources of an available frequency space/channel/bandwidth, as is illustrated in FIG. 1, thus increasing a spectral efficiency measure of the forward-link communications. In some embodiments, the staggering in frequency may be equal (or approximately equal) to ½T (i.e., one half of the inverse of a signaling interval as is illustrated in FIG. 1. In other embodiments, the staggering in frequency may be equal to one or more other values and/or may vary across an available frequency space. It will be understood that in some embodiments, one or more repeats of aR, over respective one or more signaling intervals, by a transmitter that is transmitting aR, may be used to increase an aggregate signal energy associated with a reception/detection of R (since |a|<1). Accordingly, a probability of error associated with the reception/detection of R may be reduced at a reduction of capacity associated with the second/red signal, R.

It will be understood that even though principles of frequency-domain coherent combining of signal samples have been disclosed herein, the principles disclosed herein are also applicable to coherent combining of time-domain signal samples. Accordingly, first and second time-domain pulse trains may be transmitted, for example, that may be staggered therebetween by, for example, one half of a signaling interval (or any other interval), creating a time-domain interleaved/staggered blue-red pulse train analogous to the interleaved/staggered blue-red frequency-domain pulse train of FIG. 1. It will also be understood that one or more pilot signals, that may be transmitted by a transmitter that is also transmitting the first and/or the second signals, may be used by a receiver to determine/estimate one or more parameters that are needed for signal processing at the receiver. Further, it will also be understood that receiver signal processing embodiments, as described herein, may also be used to reduce a level of intermodulation interference by reducing a power requirement of a transmitter, as will surely be appreciated by those skilled in the art. Also, those skilled in the art will recognize that one or more subcarriers of the dotted signal (i.e., of the dotted OFDM carrier; see FIG. 1) may be configured to carry/transport Forward Error Correction ("FEC") information to further aid in improving communications performance at a receiver.

According to further embodiments of the present invention, first and second receiver chains, comprising respective first and second Low Noise Amplifiers ("LNAs"), may be used by a receiver to derive the frequency-domain observable vectors b and r, respectively. These further embodiments of the present invention may, for example, relate to a MIMO receiver/transmitter, method and/or device, as will be appreciated by those skilled in the art. Accordingly, the noise vectors n and v may be statistically independent therebetween. It will be understood that a receiver, comprising the first and second receiver chains and/or any other configuration/embodiment associated with the present invention, may be a receiver of a mobile or transportable device (e.g., a receiver of a wireless terminal or computer) or a receiver of a fixed device (e.g., a receiver of a base station, DSL/cable modem or any other access point in a home or business). It will also be understood that in some embodiments, respective first and second antennas that may be associated with the first and second receiver chains may be spaced apart (i.e., may be at a distance) therebetween and/or may be configured to preferentially receive electromagnetic energy over respective first and second polarizations that may be different therebetween. In other embodiments, the first and second antennas may be substantially co-located. In further embodiments, the first and second antennas may comprise a single antenna subsystem that may be used to provide respective first and second signals to the first and second receiver chains/LNAs.

Those skilled in the art will appreciate that, in some embodiments, a receiver comprising a single receiver chain (and a single antenna subsystem) may be used instead of a receiver comprising two receiver chains (and two respective antennas) as described above. In some embodiments, a correlation that may exist between the noise vectors n and v may not substantially degrade a communications performance, such as, for example, a bit error-rate, or the communications performance may be degraded by a small/acceptable amount. In some embodiments, a correlation that may exist between the noise vectors n and v may not substantially degrade communications performance if the quantity $\delta^T$ (of the decision variable $\gamma^T b + \delta^T r$) is complex-valued and/or represents a rotation. In rotating r, the noise v is also rotated, de-correlating n and v.

Further to the embodiments described above and/or in the U.S. Provisional Applications cited herein, including all combinations and/or sub-combinations thereof, a transmitter may be configured to transmit a signal vector B for the solid signal and the transmitter may also be configured to transmit a signal vector $R = \bar{a}^{-1} B$ for the dotted signal (wherein "$\bar{a}^{-1}$" denotes inverse of a). Accordingly, a receiver may be configured to derive frequency-domain observable vectors $b = 2B + n$ and $r = (\bar{a}^{-1} + \bar{u}) B + v$. Further, a receiver processor may be configured to combine the two frequency-domain observable vectors b and r, yielding $b'_k = \gamma^T b + \delta^T r$, such as, for example, a mean-squared performance measure between $b'_k$ and $B_k$ (a $k^{th}$ element of B) is minimized or reduced. It will be understood that the superscript "T" on a vector denotes transpose or conjugate transpose (i.e., Hermitian transpose), as appropriate. Furthermore, it will be understood that $B_k$ may be complex-valued and denotes the $k^{th}$ element of the data vector B (k=1, 2, ..., N). Also, it will be understood that the receiver vectors γ and δ may, in some embodiments, take-on different values for different values of the index k.

In some embodiments, a receiver may be configured to generate 2N samples of a received signal, x(t)+N(t), over a signaling interval, T, thereof. That is, letting the received signal be y(t)=x(t)+N(t), wherein x(t) denotes a desired signal component and N(t) denotes noise and/or interference, the receiver may be configured to generate a set of 2N samples, $\{y(t_1), y(t_2), y(t_3), y(t_4), y(t_5), \ldots, y(t_{2N})\}$, and to use a first subset of the 2N samples, comprising, for example, N of the 2N samples, that may comprise, for example, odd indexed samples $\{y(t_1), y(t_3), y(t_5), \ldots\}$ of the 2N samples, to form a first Discrete Fourier Transform ("DFT") and/or a first Fast Fourier Transform ("FFT"), that may be a first N-point DFT and/or a first N-point FFT at the frequencies k/T; k=1, 2, ..., N; and to use a second subset of the 2N samples, comprising, for example, M of the 2N samples, that may comprise, for example, even indexed samples $\{y(t_2), y(t_4), y(t_6), \ldots\}$ of the 2N samples, to form a second DFT and/or a second FFT, that may be a second M-point DFT and/or a second M-point FFT at the frequencies (2n+1)/2T; n=1, 2, ..., M. In some embodiments, M=N; in other embodiments, M<N; in further embodiments, M>N. The first subset of the 2N samples may also be referred to herein as the first set of samples or the first set of N discrete-time samples and the second subset of the 2N samples may also be referred to herein as the second set of samples or the second set of N discrete-time samples.

It will be understood that the first subset of the 2N samples may, in accordance with some embodiments of the invention, comprise a number of samples that is not equal to a number of samples associated with the second subset of the 2N samples. Similarly, the same may be stated with respect to the terminology "first set of samples" and "second set of samples," and with respect to the terminology "first set of N discrete-time samples" and "second set of N discrete-time samples." To further clarify, the "N" in "first set of N discrete-time samples" and the "N" in "second set of N discrete-time samples" does not necessarily constrain these terms to be associated with an equal number "N" of samples. A number of samples associated with the "first set of N discrete-time samples" may be different than a number of samples that is associated with the "second set of N discrete-time samples."

Figure 10:
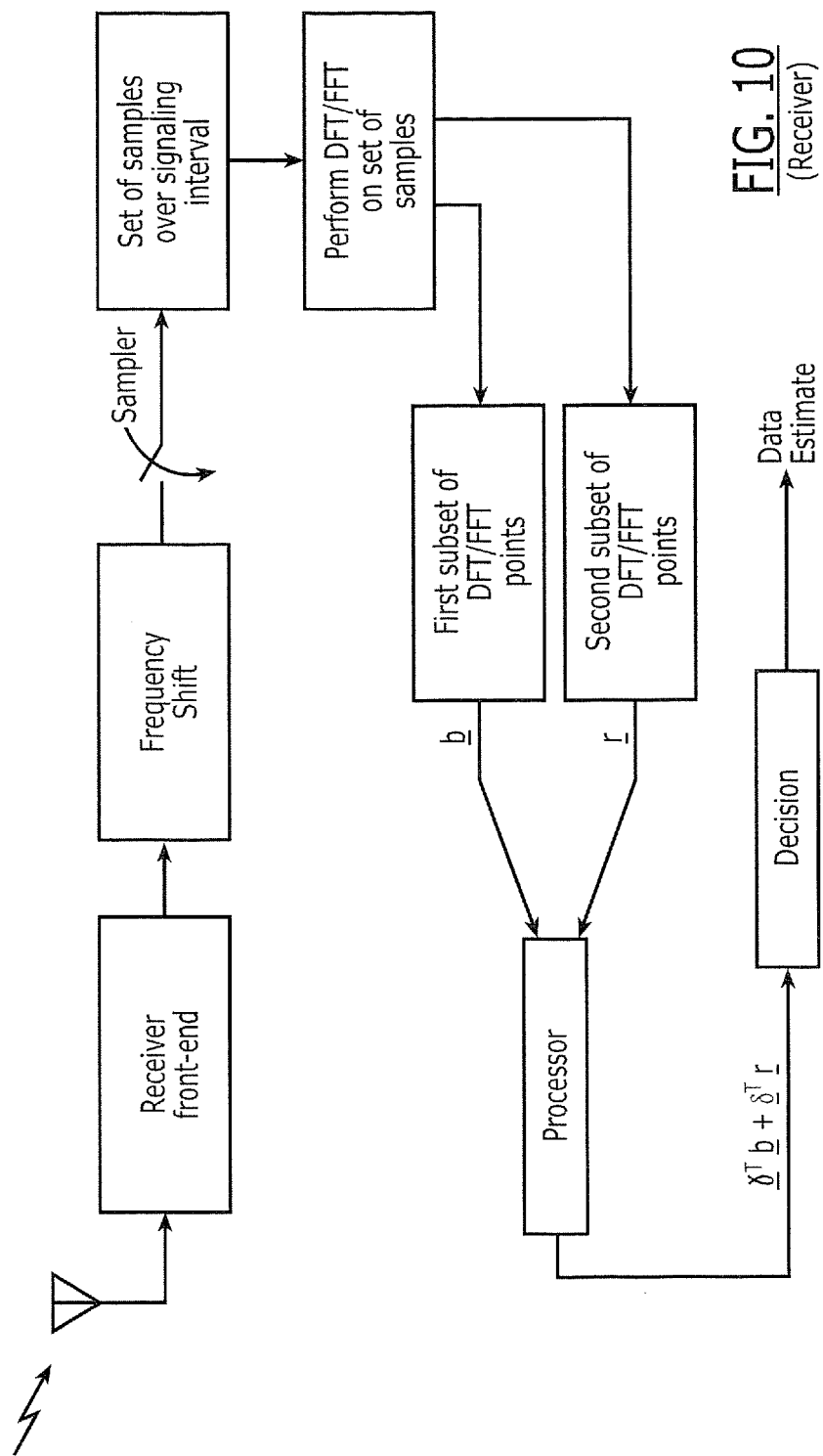
Figure 11:
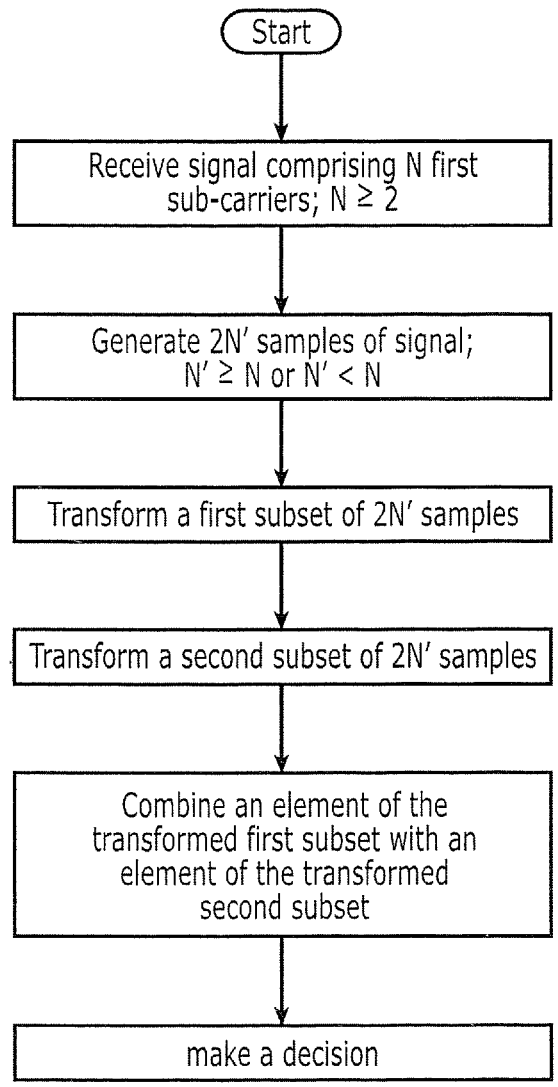

In reference to FIG. 1, it will be understood that, according to embodiments of the present invention, a transmitted/received signal may comprise $N_0$ first sub-carriers (the solid sub-carriers of FIG. 1) that may be orthogonal therebetween and $M_0$ second sub-carriers (the dotted sub-carriers of FIG. 1) that may be orthogonal therebetween but may not be orthogonal to the $N_0$ first sub-carriers (e.g., in some embodiments of the invention, at least one of the $M_0$ second sub-carriers is not orthogonal to any one of the $N_0$ first sub-carriers); wherein $N_0 \geq 2$ and $M_0 \geq N_0$ or $M_0 < N_0$, and wherein $M_0 \geq 0$. Further, it will be understood that a receiver may be configured to generate 2N' samples of the transmitted/received signal; wherein $N' \geq N_0$; and to perform a first transformation on a first sub-set of the 2N' samples, comprising N'' samples; wherein $N'' \leq 2N'$; and to perform a second transformation on a second sub-set of the 2N' samples, comprising N''' samples; wherein $N''' \leq 2N'$; and to combine an element of the first transformation with an element of the second transformation (as is further illustrated by the flow-chart of FIG. 11 and by FIGS. 8, 9 and 10). In some embodiments, N''=N'''=N'.

In some embodiments, the signal y(t)=x(t)+N(t) may be a passband signal, centered at a carrier frequency $f_c$ and comprising a bandwidth N/T (i.e., the signal y(t) may occupy and/or be allocated frequencies from $f_c$−N/2T to $f_c$+N/2T), and a receiver may be configured to generate any desired number of samples of y(t) over a T-seconds signaling interval thereof. In other embodiments, the passband signal y(t) may be shifted and/or translated in frequency so as to be centered substantially at the frequency N/2T after it has been frequency shifted/translated (thus comprising frequency content from substantially zero Hz to N/T Hz after it has been frequency shifted/translated), and the receiver may be configured to generate samples of y(t) by operating on the frequency shifted/translated version of y(t). In further embodiments, the passband signal y(t) may be shifted/translated in frequency so as to be centered substantially at zero frequency after it has been frequency shifted/translated (and thus comprise frequency content from substantially −N/2T Hz to N/2T Hz), and the receiver may be configured to generate samples by operating on this frequency shifted/translated version of y(t).

In yet further embodiments, the passband signal y(t) may be shifted/translated in frequency so as to be centered substantially at a frequency $f_c'$; wherein $f_c'$ may be smaller than $f_c$ or greater than $f_c$; and the shifted/translated signal may thus comprise frequency content from substantially $f_c'$−N/2T Hz to $f_c'$+N/2T Hz, and the receiver may be configured to generate samples by operating on this frequency shifted/translated version of y(t). In some embodiments, the desired number of samples over the T-seconds signaling interval is 2N. In other embodiments, the desired number of samples over the T-seconds signaling interval is N. In further embodiments, the desired number of samples over the T-seconds signaling interval may be any desired number of samples that may differ from N or 2N.

Accordingly, a receiver may be configured, in some embodiments, to generate 2N time-domain samples of the received signal x(t)+N(t) over the T-seconds signaling interval using a receiver sampling rate of 2N/T. In further embodiments, the receiver may be configured to generate N time-domain samples of the received signal x(t)+N(t) over the T-seconds signaling interval using a receiver sampling rate of N/T. It will be understood that, in some embodiments, a receiver sampling rate may exceed N/T and/or 2N/T, while in other embodiments, a receiver sampling rate may be smaller than N/T and/or 2N/T. In some embodiments, a receiver sampling rate may depend upon an autocorrelation function that is associated with N(t). Given that a spectrum of y(t), on a positive frequency axis, is centered at a frequency $f_c'$, and thus the spectrum of y(t) comprises frequency content from substantially $f_c'$−N/2T Hz to substantially $f_c'$+N/2T Hz, an autocorrelation function of N(t), subject to ideal passband filtering of y(t) about $f_c'$, may be shown to be:

$$R(\tau) = 2\eta_0(N/T)\{[\sin \pi(N/T)\tau]/[\pi(N/T)\tau]\} \cos 2\pi f_c'\tau;$$

wherein $\eta_0$ may be a constant and may represent a noise density, such as a noise power spectral density or a noise energy spectral density.

Accordingly, setting $2\pi f_c'\tau = \pi/2$ yields $R(\tau)=0$ for $\tau=1/(4f_c')$. We thus observe, that if, for example, we set $f_c'=N/2T$, we will have $R(\tau)=0$ for $\tau=T/2N$ and, a receiver that is configured to sample at a rate of 2N/T will yield 2N samples over T; wherein each sample of the 2N samples comprises a noise component that is uncorrelated from any other noise component associated with any other of the 2N samples. Those skilled in the art know that uncorrelated noise components imply independent noise components, assuming Gaussian noise statistics. Accordingly, if all 2N noise components are independent therebetween, and a first set of the 2N samples is used to form b, while a second set of the 2N samples is used to form r; wherein the second set of the 2N samples does not intersect (i.e., does not have any elements in common with) the first set of the 2N samples, the n and the v noise vectors will be uncorrelated and independent therebetween.

It may be observed from the $R(\tau)$ equation above that if $f_c'$ is, for example, doubled, a sampling rate of the receiver may also be doubled, while the receiver may continue to provide samples of y(t) comprising noise components that are uncorrelated and/or independent therebetween. Accordingly, in some embodiments, a receiver may be configured to shift/translate, in frequency, a received signal y(t) such as to center a spectrum of y(t) at a value of $f_c'$ that allows the receiver to take more than 2N samples of y(t), over T, while maintaining noise components between samples uncorrelated and/or independent. As such, the more than 2N samples may now be used to define more than two subsets. The more than two subsets of the more than 2N samples may be used to provide more than two DFTs and/or FFTs, which may be combined, according to the principles disclosed herein, to allow further improvements in communications performance and/or capacity.

Specifically, $R(\tau)=0$ for $\tau=1/(4f_c')$, as was stated earlier. Accordingly, if, for example, we set $f_c'=N/T$, we will have $R(\tau)=0$ for $\tau=T/4N$ and, a receiver that is configured to sample at a rate of 4N/T will yield 4N samples over T; wherein each sample of the 4N samples comprises a noise component that is uncorrelated from any other noise component associated with any other of the 4N samples. Thus, if all 4N noise components are independent therebetween, a first subset of the 4N samples comprising, for example, N samples, may be used via a first N-point FFT to form a "b'," at, for example, the frequencies (k+N)/T; k=1, 2, . . . , N; while a second subset of the 4N samples comprising, for example, N samples, may be used to form a "r'," at, for example, the frequencies (k+N+½)/T; k=1, 2, . . . , N; wherein, as before, the second subset of the 4N samples does not intersect the first subset of the 4N samples, thus allowing the n' noise vector (i.e., the noise component of b') and the v' noise vector (i.e., the noise component of r') to be uncorrelated and independent therebetween. But there are still 2N samples that have not been used. These remaining 2N samples may be used to form a further b'' at, for example, the frequencies (k+N+¼)/T; k=1, 2, . . . , N; and a further r'' at, for example, the frequencies (k+N+¾)/T; k=1, 2, . . . , N; and wherein at least some of b', r', b'' and r'' (and in some embodiments all of b', r', b'' and r'') may be combined therebetween, for example, using a LMSE criterion, or any other criterion, as has previously been discussed herein. This technique may clearly be applied to any case wherein a number of samples of y(t), over T, is an integer multiple of N. In other embodiments, the number of samples of y(t), over T, may not be an integer multiple of N.

In some embodiments, a second set of samples (or a second set of discrete-time samples), that may comprise N samples, may be based upon a first set of samples (or a first set of discrete-time samples), that may comprise N samples. In further embodiments, the second set of samples may be derived from the first set of samples by multiplying the first set of samples by a sinusoidal function or by an exponential function that may be a complex exponential function (e.g., a complex sinusoidal function). In additional embodiments, the first set of samples may be used to generate a first Discrete Fourier Transform ("DFT") and/or a first Fast Fourier Transform ("FFT"), at frequencies of k/T; k=1, 2, . . . , N; and the second set of samples may be used to generate a second DFT and/or a second FFT at frequencies of (2n+1)/2T; n=1, 2, . . . , M; wherein M may be equal to N, M may be greater than N or M may be less than N.

It will be understood that any embodiment or combination/sub-combination of embodiments described herein and/or in any of the U.S. Provisional Applications cited herein may be used to provide wireless and/or wireline systems, devices and/or methods. It will also be understood that even though embodiments of the present invention are presented herein in terms of a receiver processor that is configured to reduce/minimize a mean-squared error quantity, performance index and/or cost function (i.e., a receiver processor that yields one or more Least Mean Squared Error ("LMSE") receiver observables), any other quantity, performance index and/or cost function other than LMSE and/or any variation of LMSE (such as, for example, Kalman, fast Kalman, LMS/Newton, sequential regression, random-search, lattice structure/predictor, zero-forcing, least squares, recursive least squares, maximum likelihood sequence estimation, maximum a posteriori probability, maximum ratio combining and/or any variations, combinations and/or sub-combinations thereof, etc.) may be used, as will be appreciated by those skilled in the art, in lieu of LMSE or in conjunction and/or in combination with LMSE.

It will be understood that in some embodiments such as, for example, in OFDM/OFDMA embodiments, wherein a plurality of channels may be associated with a single carrier, wherein the plurality of channels may correspond to a respective plurality of users, a respective plurality of receiver vectors (in γ and/or in δ) may be used to accommodate the plurality of channels/users. Each channel of the plurality of channels may be associated with a different signal-to-noise ratio, necessitating, according to some embodiments, its own (individually optimized) γ and/or δ vectors. The γ and/or δ vectors may be updated (iteratively and/or non-iteratively) responsive to, for example, one or more measurements of, for example, a channel's signal-to-noise ratio.

In a conventional OFDM system, an OFDM carrier, comprising a plurality of sub-carriers, may be amplified, prior to transmission, via a single Power Amplifier ("PA"). As such, owing to an output power requirement of the conventional OFDM system, the PA may be driven to operate (at least to some extent) in a non-linear region thereof, generating non-linear distortion which may adversely impact the conventional OFDM system, particularly when the OFDM carrier includes at least some sub-carriers that are based upon a high-order modulation alphabet, such as, for example, 64-QAM, 128-QAM, 256-QAM, etc.

Figure 6:
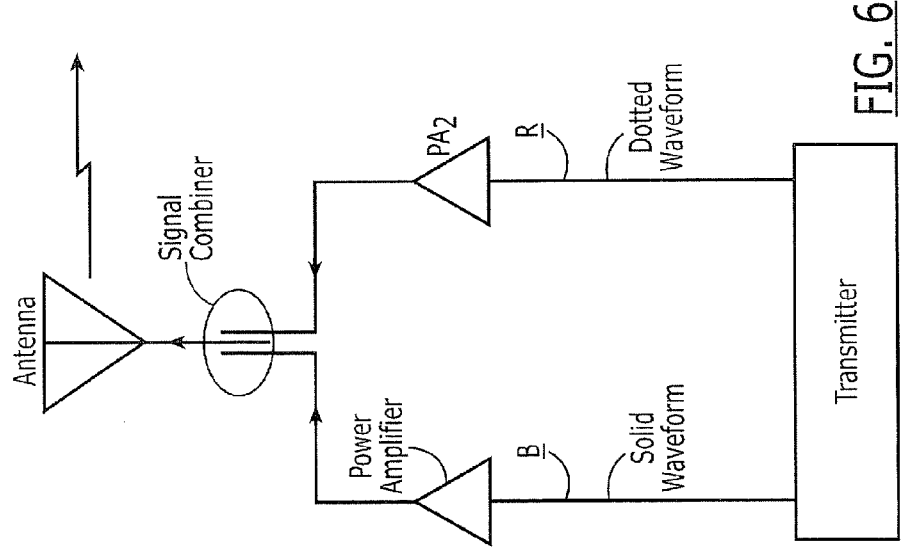
FIG. 6 illustrates methods/systems/devices according to embodiments of the invention.

In some embodiments of the present invention, at least two PAs are provided wherein at least a first one of the at least two PAs is used to amplify at least a portion of the "solid" waveform/signal (see FIG. 1), at least a second one of the at least two PAs is used to amplify at least a portion of the "dotted" waveform/signal (see FIG. 1) and wherein respective outputs of the at least two PAs are combined, using a signal combiner, prior to the two amplified signals being transmitted over one or more propagation media/channels. FIG. 6 is illustrative of a wireless OFDM system and/or method, according to various embodiments of the present invention. It will be understood, however, that the principles disclosed herein are also applicable to non-wireless OFDM systems and/or methods. It will also be understood that the respective outputs of the at least two PAs of FIG. 6 need not be combined, according to some embodiments of the present invention, but instead, may be used to excite respective at least first and second antenna elements (not illustrated in FIG. 6) or respective at least first and second non-wireless transmission media. Further to the above, it will be understood that the label "Solid Waveform" as it appears in FIG. 6 means "at least a portion of the Solid Waveform," or "at least some subcarriers of the Solid Waveform." Similarly, it will be understood that the label "Dotted Waveform" as it appears in FIG. 6 means "at least a portion of the Dotted Waveform," or "at least some subcarriers of the Dotted Waveform." Accordingly, each one of the PAs, as illustrated in FIG. 6, may operate at a lower output power level, providing greater linearity, reducing a non-linear distortion thereof and allowing for improved performance of an OFDM carrier, that may include at least some sub-carriers that are based upon a high-order modulation alphabet, such as, for example, 64-QAM, 128-QAM, 256-QAM, etc.

Figure 7:
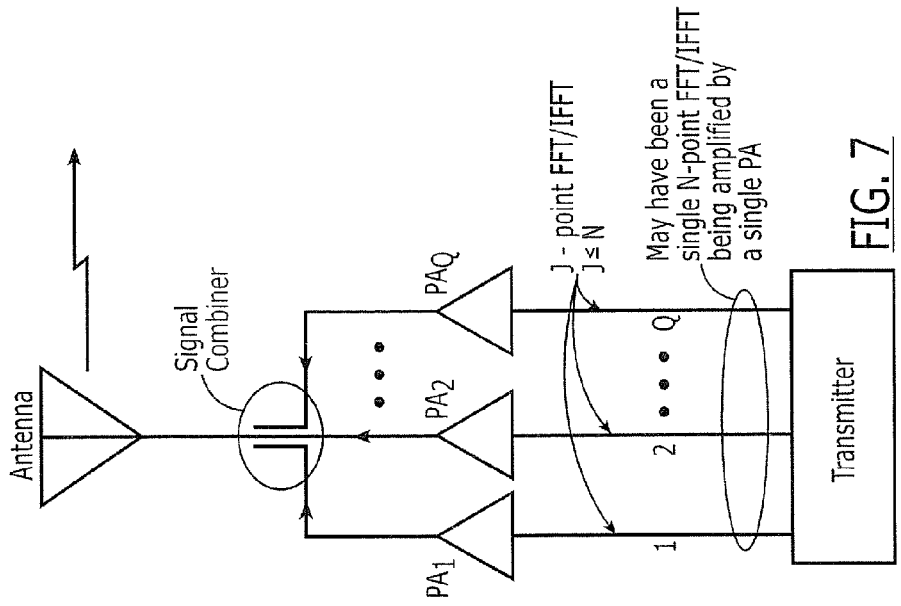
FIG. 7 illustrates methods/systems/devices according to embodiments of the invention.

According to further embodiments of the present invention, an OFDM carrier comprising N sub-carriers (N≧2), which may conventionally be based upon a single N-point FFT and/or a single N-point IFFT (or a single N-point DFT/IDFT) may instead be based upon Q, Q≧2, J-point FFTs and/or Q J-point IFFTs (or Q J-point DFTs/IDFTs), wherein J≦N. (It will be understood that, according to some embodiments, at least one FFT and/or IFFT of the Q "J-point FFTs and/or IFFTs" may be based upon and/or include a number of points that is different than J.) Each one of the Q "J-point FFTs and/or IFFTs," representing a grouping of less than N sub-carriers (and in some embodiments a grouping of up to N sub-carriers), may be provided to one of Q respective PAs, as is illustrated in FIG. 7. (It will be understood that FIG. 7 is only illustrative and assumes a wireless environment and that the principles disclosed herein also apply to any other non-wireless environment and/or transmission medium.) Following amplification, Q respective outputs of the Q respective PAs may be combined by a signal combiner and used to excite an antenna (or any other element of a wireless/non-wireless transmission medium), as is illustrated in FIG. 7. It will be understood that in some embodiments, at least a first and a second output of respective first and second PAs, of the Q PAs, may be used to excite respective first and second antennas (not illustrated in FIG. 7).

It will also be understood that any OFDM system/method/device, conventional or otherwise, including wireless and non-wireless (i.e., wireline, cable, fiber optical, etc.) systems, methods and/or devices, or any other multi-carrier system, method and/or device (that may not be based upon OFDM principles), may be based on a transmitter architecture/method as is described herein and is illustrated in FIG. 6 and/or FIG. 7, to reduce (or minimize) an output power level requirement of one or more individual PAs, improve linearity associated with amplification and/or reduce (or eliminate) a communications performance penalty due to non-linear distortion, while increasing a system throughput (or capacity) by allowing higher-order constellation/modulation alphabets to be used, such as, for example a 256-QAM or even a 1024 QAM constellation/modulation alphabet. In will also be understood that receiver embodiments as described herein and illustrated in FIGS. 8, 9, 10 and 11, may be combined with transmitter embodiments as described herein and illustrated in FIGS. 6 and 7, to further reduce non-linear distortion effects.

In the present specification and figures (and in the references that have been incorporated herein by reference in their entirety as if set forth fully herein), there have been disclosed embodiments of the invention and, although specific terms are employed, they are used in a generic and descriptive sense only and not for purposes of limitation; the following claims setting forth the scope of the present invention.

The invention claimed is:

1. A method comprising:
    receiving by a receiver a signal comprising N first sub-carriers and M second sub-carriers; wherein $N \geq 2$, $M \geq 1$, the N first sub-carriers are received over a set of frequencies and over a T seconds time interval, the M second sub-carriers are received over at least some of the set of frequencies and, at least partially, over the T seconds time interval, the N first sub-carriers are orthogonal therebetween, the M second sub-carriers are orthogonal therebetween when M>1 and wherein at least one of the M second sub-carriers is not orthogonal to at least one of the N first sub-carriers;
    processing the N first sub-carriers and the M second sub-carriers jointly at the receiver to reduce interference from the N first sub-carriers into the M second subcarriers and/or from the M second sub-carriers into the N first sub-carriers; and
    deriving data responsive to said jointly processing,
    wherein a spacing between two adjacent sub-carriers of the N first sub-carriers is 1/T Hz, a spacing between two adjacent sub-carriers of the M second sub-carriers is 1/T Hz and a spacing between a first sub-carrier of the N first sub-carriers and a sub-carrier of the M second sub-carriers that is adjacent to the first sub-carrier of the N first sub-carriers is less than 1/T Hz.

2. The method according to claim 1, wherein said jointly processing comprises:
    generating at the receiver at least 2N samples of the signal;
    performing a first transformation on a first sub-set of the at least 2N samples;
    performing a second transformation on a second sub-set of the at least 2N samples; and
    combining an output of the first transformation with an output of the second transformation.

3. The method according to claim 1, wherein a spacing between two adjacent sub-carriers of the N first sub-carriers is 1/T Hz, a spacing between two adjacent sub-carriers of the M second sub-carriers is 1/T Hz and a spacing between a first sub-carrier of the N first sub-carriers and a sub-carrier of the M second sub-carriers that is adjacent to the first sub-carrier of the N first sub-carriers is ½T Hz.

4. The method according to claim 2, wherein the first sub-set of the at least 2N samples comprises at least N samples and the second sub-set of the at least 2N samples comprises at least N samples.

5. The method according to claim 4, wherein a spacing in time between two adjacent samples of the first sub-set is T/N seconds, a spacing in time between two adjacent samples of the second sub-set is T/N seconds and a spacing in time between a first sample of the first sub-set and a sample of the second sub-set that is adjacent in time to the first sample of the first sub-set is T/2N seconds.

6. The method according to claim 2, wherein the first transformation and the second transformation each comprises a time-domain to frequency-domain transformation.

7. The method according to claim 6, wherein the time-domain is a discrete time-domain, the frequency-domain is a discrete frequency-domain and wherein the time-domain to frequency-domain transformation comprises a Discrete Fourier Transform and/or a Fast Fourier Transform.

8. The method according to claim 2, further comprising modifying the output of the first transformation and/or modifying the output of the second transformation prior to the combining.

9. The method according to claim 8, wherein combining comprises:
    forming $\gamma^T b + \delta^T r$; wherein b comprises the output of the first transformation, r comprises the output of the second transformation, $\gamma^T b$ comprises modifying the output of the first transformation, $\delta^T r$ comprises modifying the output of the second transformation and wherein the superscript T denotes transpose and/or conjugate transpose.

10. The method according to claim 9, further comprising:
    calculating $\gamma$ and $\delta$ such that the statistical expectation $E[|\gamma^T b + \delta^T r - B_k|^2]$ is minimized; wherein $E[\cdot]$ denotes statistical expectation, $|\cdot|$ denotes magnitude and $B_k$ denotes a data element that is associated with a $k^{th}$ sub-carrier; k=1, 2, ..., N.

11. The method according to claim 10, wherein calculating comprises calculating for at least one value of k; k=1, 2, ..., N.

12. The method according to claim 11, further comprising:
    using $\gamma^T b + \delta^T r$ to determine an estimate of $B_k$ for at least one value of k.

13. The method according to claim 1, further comprising:
    transmitting by a transmitter the N first sub-carriers, $N \geq 2$, over the set of frequencies such that the N first sub-carriers span a time duration of T seconds and are orthogonal therebetween; and
    transmitting by the transmitter the M second sub-carriers, $M \geq 1$, at least partially concurrently with said transmitting by the transmitter the N first sub-carriers, using at least some of the set of frequencies, such that the M second sub-carriers are orthogonal therebetween, when M>1;
    wherein at least one of the M second sub-carriers is not orthogonal to at least one of the N first sub-carriers.

14. The method according to claim 13, further comprising:
    transmitting the N first sub-carriers using a first antenna element/pattern of the transmitter; and
    transmitting the M second sub-carriers using a second antenna element/pattern of the transmitter.

15. The method according to claim 14, wherein transmitting the N first sub-carriers using a first antenna element/pattern of the transmitter comprises transmitting the N first sub-carriers to a first device and wherein transmitting the M second sub-carriers using a second antenna element/pattern of the transmitter comprises transmitting the M second sub-carriers to a second device that is at a distance from the first device.

16. The method according to claim 1, wherein said receiving by a receiver a signal comprising N first sub-carriers and M second sub-carriers comprises:
    receiving by the receiver the N first sub-carriers from a first device; and receiving by the receiver the M second sub-carriers from a second device that is at a distance from the first device.

17. The method according to claim 16, wherein receiving by the receiver the N first sub-carriers from a first device comprises using a first antenna element/pattern of the receiver and wherein receiving by the receiver the M second sub-carriers from a second device comprises using a second antenna element/pattern of the receiver.

18. The method according to claim 1, further comprising:
segregating by a transmitter a plurality of sub-carriers into first and second subsets of sub-carriers;
using a first amplifier to amplify the first subset of sub-carriers;
using a second amplifier to amplify the second subset of sub-carriers; and
transmitting by the transmitter the amplified first subset of sub-carriers and the amplified second subset of sub-carriers.

19. The method according to claim 18, further comprising:
prior to said transmitting, combining the amplified first subset of sub-carriers with the amplified second subset of sub-carriers; and
exciting a transmission medium with the amplified first subset of sub-carriers and the amplified second subset of sub-carriers that have been combined.

20. The method according to claim 19, wherein said exciting a transmission medium comprises:
providing the amplified first subset of sub-carriers and the amplified second subset of sub-carriers that have been combined to an antenna; and
radiating from the antenna the amplified first subset of sub-carriers and the amplified second subset of sub-carriers that have been combined.

21. The method according to claim 18, further comprising:
prior to said transmitting, maintaining the amplified first subset of sub-carriers segregated from the amplified second subset of sub-carriers; and
exciting a transmission medium with the amplified first subset of sub-carriers and the amplified second subset of sub-carriers that have been maintained segregated therebetween.

22. The method according to claim 21, wherein said exciting a transmission medium comprises:
providing the amplified first subset of sub-carriers and the amplified second subset of sub-carriers to respective first and second antennas; and
radiating from the first and second antennas, respectively, the amplified first subset of sub-carriers and the amplified second subset of sub-carriers.

23. The method according to claim 1, further comprising:
transmitting by a transmitter the signal comprising the N first sub-carriers and the M second sub-carriers;
wherein $N \geq 2$, $M \geq 1$;
wherein the N first sub-carriers are transmitted by the transmitter over the set of frequencies and over the T seconds time interval;
wherein the M second sub-carriers are transmitted by the transmitter over at least some of the set of frequencies and, at least partially, over the T seconds time interval;
wherein the N first sub-carriers are transmitted by the transmitter such that they are orthogonal therebetween;
wherein the M second sub-carriers are transmitted by the transmitter such that they are orthogonal therebetween when $M>1$; and
wherein the N first sub-carriers and the M second sub-carriers are transmitted by the transmitter such that at least one of the M second sub-carriers is not orthogonal to at least one of the N first sub-carriers.

24. The method according to claim 23, wherein said transmitting by a transmitter the signal comprising the N first sub-carriers and the M second sub-carriers comprises:
transmitting by the transmitter the N first sub-carriers using a first component of the transmitter; and
transmitting by the transmitter the M second sub-carriers using a second component of the transmitter that is physically separate and at a distance from the first component of the transmitter.

25. The method according to claim 23, further comprising:
amplifying the N first sub-carriers and the M second sub-carriers using respective first and second different amplifiers by the transmitter.

26. The method according to claim 23, further comprising:
transmitting the N first sub-carriers and the M second sub-carriers using respective first and second different antennas by the transmitter.

27. The method according to claim 1, wherein said receiving by a receiver a signal comprising N first sub-carriers and M second sub-carriers further comprises:
receiving by the receiver the N first sub-carriers using a first antenna of the receiver; and
receiving by the receiver the M second sub-carriers using a second antenna of the receiver that is different from the first antenna of the receiver.

28. A communications system comprising a receiver that is configured to:
receive a signal comprising N first sub-carriers and M second sub-carriers; wherein $N \geq 2$, $M \geq 1$, the N first sub-carriers are received by the receiver over a set of frequencies and over a T seconds time interval, the M second sub-carriers are received by the receiver over at least some of the set of frequencies and, at least partially, over the T seconds time interval, the N first sub-carriers are orthogonal therebetween, the M second sub-carriers are orthogonal therebetween when $M>1$ and wherein at least one of the M second sub-carriers is not orthogonal to at least one of the N first sub-carriers;
process the N first sub-carriers and the M second sub-carriers jointly to reduce interference from the N first sub-carriers into the M second subcarriers and/or from the M second sub-carriers into the N first sub-carriers; and
derive data responsive to having processed jointly the N first sub-carriers and the M second sub-carriers,
wherein a spacing between two adjacent sub-carriers of the N first sub-carriers is 1/T Hz, a spacing between two adjacent sub-carriers of the M second sub-carriers is 1/T Hz and a spacing between a first sub-carrier of the N first sub-carriers and a sub-carrier of the M second sub-carriers that is adjacent to the first sub-carrier of the N first sub-carriers is less than 1/T Hz.

29. The communications system according to claim 28, wherein the receiver is further configured to:
generate at least 2N samples of the signal;
perform a first transformation on a first sub-set of the at least 2N samples;
perform a second transformation on a second sub-set of the at least 2N samples; and
combine an output of the first transformation with an output of the second transformation.

30. The communications system according to claim 28, wherein a spacing between two adjacent sub-carriers of the N first sub-carriers is 1/T Hz, a spacing between two adjacent sub-carriers of the M second sub-carriers is 1/T Hz and a spacing between a first sub-carrier of the N first sub-carriers and a sub-carrier of the M second sub-carriers that is adjacent to the first sub-carrier of the N first sub-carriers is ½T Hz.

31. The communications system according to claim 29, wherein the first sub-set of the at least 2N samples comprises at least N samples and the second sub-set of the at least 2N samples comprises at least N samples.

32. The communications system according to claim 31, wherein a spacing in time between two adjacent samples of the first sub-set is T/N seconds, a spacing in time between two adjacent samples of the second sub-set is T/N seconds and a spacing in time between a first sample of the first sub-set and a sample of the second sub-set that is adjacent in time to the first sample of the first sub-set is T/2N seconds.

33. The communications system according to claim 29, wherein the first transformation and the second transformation each comprises a time-domain to frequency-domain transformation.

34. The communications system according to claim 33, wherein the time-domain is a discrete time-domain, the frequency-domain is a discrete frequency-domain and wherein the time-domain to frequency-domain transformation comprises a Discrete Fourier Transform and/or a Fast Fourier Transform.

35. The communications system according to claim 29, wherein the receiver is further configured to modify the output of the first transformation and/or to modify the output of the second transformation before the receiver combines the output of the first transformation with the output of the second transformation.

36. The communications system according to claim 35, wherein the receiver is further configured to form $\gamma^T b + \delta^T r$; wherein b comprises the output of the first transformation, r comprises the output of the second transformation, $\gamma^T b$ comprises the modified output of the first transformation, $\delta^T r$ comprises the modified output of the second transformation and wherein the superscript T denotes transpose and/or conjugate transpose.

37. The communications system according to claim 36, wherein the receiver is further configured to calculate the vectors $\gamma$ and $\delta$ such that the statistical expectation $E[|\gamma^T b + \delta^T r - B_k|^2]$ is minimized; wherein $E[\cdot]$ denotes statistical expectation, $|\cdot|$ denotes magnitude and $B_k$ denotes a data element that is associated with a $k^{th}$ sub-carrier; k=1, 2, ..., N.

38. The communications system according to claim 37, wherein the receiver is configured to calculate the vectors $\gamma$ and $\delta$ for at least one value of k; k=1, 2, ..., N.

39. The communications system according to claim 38, wherein the receiver is further configured to use $\gamma^T b + \delta^T r$ to determine an estimate of $B_k$ for at least one value of k.

40. The communications system according to claim 28, further comprising a transmitter that is configured to:
transmit the N first sub-carriers, N≧2, over the set of frequencies such that the N first sub-carriers span a time duration of T seconds and are orthogonal therebetween; and
transmit the M second sub-carriers, M≧1, at least partially concurrently with the N first sub-carriers, using at least some of the set of frequencies, such that the M second sub-carriers are orthogonal therebetween, when M>1;
wherein at least one of the M second sub-carriers is not orthogonal to at least one of the N first sub-carriers.

41. The communications system according to claim 40, wherein the transmitter is further configured to:
transmit the N first sub-carriers using a first antenna element/pattern of the transmitter; and transmit the M second sub-carriers using a second antenna element/pattern of the transmitter.

42. The communications system according to claim 41, wherein the transmitter transmits the N first sub-carriers to a first device using the first antenna element/pattern of the transmitter and transmits the M second sub-carriers to a second device, that is at a distance from the first device, using the second antenna element/pattern of the transmitter.

43. The communications system according to claim 28, wherein the N first sub-carriers are received at the receiver from a first device and the M second sub-carriers are received at the receiver from a second device that is at a distance from the first device.

44. The communications system according to claim 43, wherein a first antenna element/pattern is used by the receiver to receive the N first sub-carriers from the first device and a second antenna element/pattern is used by the receiver to receive the M second sub-carriers from the second device.

45. The communications system according to claim 28, further comprising a transmitter that is configured to:
segregate a plurality of sub-carriers into first and second subsets of sub-carriers;
use a first amplifier to amplify the first subset of sub-carriers;
use a second amplifier to amplify the second subset of sub-carriers; and
transmit the amplified first subset of sub-carriers and the amplified second subset of sub-carriers.

46. The communications system according to claim 45, wherein the transmitter is further configured to:
combine the amplified first subset of sub-carriers with the amplified second subset of sub-carriers prior to transmission thereof; and
excite a transmission medium with the amplified first subset of sub-carriers and the amplified second subset of sub-carriers that have been combined.

47. The communications system according to claim 46, wherein the transmitter is configured to excite the transmission medium by providing the amplified first subset of sub-carriers and the amplified second subset of sub-carriers that have been combined to an antenna and to radiate from the antenna the amplified first subset of sub-carriers and the amplified second subset of sub-carriers that have been combined.

48. The communications system according to claim 45, wherein the transmitter is further configured to:
maintain the amplified first subset of sub-carriers segregated from the amplified second subset of sub-carriers; and
excite a transmission medium with the amplified first subset of sub-carriers and the amplified second subset of sub-carriers that are maintained segregated therebetween by the transmitter.

49. The communications system according to claim 48, wherein the transmitter is configured to excite the transmission medium by providing the amplified first subset of sub-carriers and the amplified second subset of sub-carriers that are maintained segregated therebetween to respective first and second antennas and to radiate from the first and second antennas, respectively, the amplified first subset of sub-carriers and the amplified second subset of sub-carriers.

50. The communications system according to claim 28, further comprising:
a transmitter that is configured to transmit the signal comprising the N first sub-carriers and the M second sub-carriers;

wherein $N \geq 2$, $M \geq 1$;

wherein the N first sub-carriers are transmitted by the transmitter over the set of frequencies and over the T seconds time interval;

wherein the M second sub-carriers are transmitted by the transmitter over at least some of the set of frequencies and, at least partially, over the T seconds time interval;

wherein the N first sub-carriers are transmitted by the transmitter such that they are orthogonal therebetween;

wherein the M second sub-carriers are transmitted by the transmitter such that they are orthogonal therebetween when $M>1$; and wherein the N first sub-carriers and the M second sub-carriers are transmitted by the transmitter such that at least one of the M second sub-carriers is not orthogonal to at least one of the N first sub-carriers.

51. The communications system according to claim 50, wherein the transmitter is configured to transmit the N first sub-carriers using a first component of the transmitter; and to transmit the M second sub-carriers using a second component of the transmitter that is physically separate and at a distance from the first component of the transmitter.

52. The communications system according to claim 50, wherein the transmitter is configured to amplify the N first sub-carriers and the M second sub-carriers using respective first and second different amplifiers of the transmitter.

53. The communications system according to claim 50, wherein the transmitter is configured to transmit the N first sub-carriers and the M second sub-carriers using respective first and second different antennas of the transmitter.

54. The communications system according to claim 28, wherein the receiver is configured to receive the N first sub-carriers using a first antenna of the receiver; and is further configured to receive the M second sub-carriers using a second antenna of the receiver that is different from the first antenna of the receiver.

* * * * *

UNITED STATES PATENT AND TRADEMARK OFFICE
CERTIFICATE OF CORRECTION

PATENT NO. : 8,462,860 B2
APPLICATION NO. : 12/481084
DATED : June 11, 2013
INVENTOR(S) : Karabinis It is certified that error appears in the above-identified patent and that said Letters Patent is hereby corrected as shown below:

In the Specification:

Column 2, Lines 54-67, through Column 33, Line 22: Delete and replace with the following -- Some embodiments further comprise modifying the element of the first transformation and/or modifying the element of the second transformation prior to the combining. In some embodiments, combining comprises: forming $\underline{\gamma}^T\underline{b} + \underline{\delta}^T\underline{r}$; wherein $\underline{b}$ comprises the element of the first transformation, $\underline{r}$ comprises the element of the second transformation, $\underline{\gamma}^T\underline{b}$ comprises modifying the element of the first transformation, $\underline{\delta}^T\underline{r}$ comprises modifying the element of the second transformation and wherein the superscript T denotes vector (or matrix) transpose and/or conjugate transpose, as appropriate.

Yet further embodiments comprise calculating $\underline{\gamma}$ and $\underline{\delta}$ such that a statistical expectation, such as, for example, $E[|\underline{\gamma}^T\underline{b} + \underline{\delta}^T\underline{r} - B_k|^2]$ is minimized; wherein $E[\bullet]$ denotes statistical expectation, $|\bullet|$ denotes magnitude and $B_k$ denotes a data --

Column 3, Lines 1-5: Delete and replace with the following

-- element that is associated with a $k^{th}$ sub-carrier; $k = 1, 2, ..., N$. In some embodiments, calculating comprises calculating for at least one value of k; $k = 1, 2, ..., N$. Some embodiments further comprise using $\underline{\gamma}^T\underline{b} + \underline{\delta}^T\underline{r}$ to determine an estimate of $B_k$ for at least one value of k, wherein $\underline{\gamma}$ and $\underline{\delta}$ may depend on k. --

Column 6, Lines 49-57: Delete and replace with the following

-- respective first and second frequency-domain signals (or frequency-domain observables), that may be expressed as $\underline{b} = \underline{B} + \underline{\bar{a}}\,\underline{R} + \underline{n}$ and $\underline{r} = \underline{R} + \underline{\bar{u}}\,\underline{B} + \underline{v}$, respectively. The first and second frequency-domain observables comprise respective desired signal components, $\underline{B}$ and $\underline{R}$, respective components reflecting interference, $\underline{\bar{a}}\,\underline{R}$ and $\underline{\bar{u}}\,\underline{B}$, and respective components reflecting noise, $\underline{n}$ and $\underline{v}$. The quantities $\underline{b}, \underline{r}, \underline{B}, \underline{R}, \underline{n}$ and $\underline{v}$ may represent vector quantities and the quantities $\underline{\bar{a}}$ and $\underline{\bar{u}}$ may represent matrix quantities. A signal processor of the receiver --

Signed and Sealed this
Twenty-first Day of October, 2014

Michelle K. Lee
*Deputy Director of the United States Patent and Trademark Office*

CERTIFICATE OF CORRECTION (continued)

U.S. Pat. No. 8,462,860 B2

Column 7, Lines 11 through Column 8, Line 38: Delete and replace with the following -- k=1, 2, ..., N; wherein T denotes the signaling interval. The first FFT/DFT may be used to provide a first N-dimensional vector "$\underline{b}$" while the second FFT/DFT may be used to provide a second vector "$\underline{r}$," that may be a second N-dimensional vector $\underline{r}$. The two vectors, $\underline{b}$ and $\underline{r}$, may then be combined in, for example, a least mean-squared-error sense. It will be understood that, in some embodiments, instead of using the even indexed samples discussed above to form/define $\underline{b}$, the odd indexed samples may be used, and instead of using the odd indexed samples discussed above to form/define $\underline{r}$, the even indexed samples may be used. Other combinations/subsets of the minimum 2N time-domain samples may also be used, in further embodiments, to form/define $\underline{b}$ and $\underline{r}$.

In other embodiments of the present invention, instead of the above or in combination with the above, a 2N-point DFT/FFT may be performed on the 2N time-domain samples and a first subset of points of the 2N-point DFT/FFT, that may be a first subset of N points of the 2N-point DFT/FFT, comprising, for example, a subset of N even indexed points of the 2N-point DFT/FFT, may be used to define the vector $\underline{b}$ while a second subset of points of the 2N-point DFT/FFT, that may be a second subset of N points of the 2N-point DFT/FFT, comprising, for example, a subset of N odd indexed points of the 2N-point DFT/FFT, may be used to define the vector $\underline{r}$. It will be understood that, in some embodiments, instead of using the even indexed samples/points discussed above to form/define $\underline{b}$, the odd indexed samples/points may be used, and instead of using the odd indexed samples/points discussed above to form/define $\underline{r}$, the even indexed samples/points may be used. Other sample/point combinations may also be used, in further embodiments, to form/define $\underline{b}$ and $\underline{r}$.

In some embodiments of the invention, prior to acquiring the minimum of 2N time-domain samples discussed above, a received passband OFDM/OFDMA carrier, whose frequency content and/or whose allocated frequency channel may be centered at a frequency $f_c$, may be shifted down (i.e., translated in frequency) not by $f_c$ (as is conventionally done) but instead, may be shifted down by $f_c - N/2T$ (or by any other value). This may be necessary, in some embodiments, to provide uncorrelated and/or independent noise vectors $\underline{n}$ and $\underline{v}$.

In some embodiments of the present invention, a signal processor may be configured to jointly process the first and second frequency domain observables $\underline{b}$, $\underline{r}$. In other embodiments, the signal processor may be configured to perform first and second signal processing operations sequentially (e.g., over respective first and second substantially non-overlapping time intervals or over respective first and second time intervals that overlap therebetween at least partially) in order to determine information (data) associated with the first and/or second transmitted signal vectors $\underline{B}$, $\underline{R}$.

The signal processor may be configured to form, for example, $\underline{\gamma}^T\underline{b}$ and $\underline{\delta}^T\underline{r}$ and to combine $\underline{\gamma}^T\underline{b}$ with $\underline{\delta}^T\underline{r}$ to form $\underline{\gamma}^T\underline{b} + \underline{\delta}^T\underline{r}$; wherein the superscript T denotes vector transpose (or matrix transpose) or conjugate transpose, as appropriate, and wherein $\underline{\gamma}$ and $\underline{\delta}$ may, according to some embodiments, denote vector quantities that may be complex-valued. The signal processor may be configured to calculate $\underline{\gamma}$ and $\underline{\delta}$ such that a statistical expectation, for example, $E[|\underline{\gamma}^T\underline{b} + \underline{\delta}^T\underline{r} - B_k|^2]$, is minimized; wherein $E[\bullet]$ denotes statistical expectation, $|\bullet|$ denotes magnitude and $B_k$ denotes a data element (complex, imaginary or real-valued) that is associated with a $k^{th}$ sub-carrier that may represent a $k^{th}$ element of $\underline{B}$; k = 1, 2, ..., N.

In some embodiments of the present invention, the signal processor may be configured to reduce and/or minimize (or substantially reduce and/or minimize) a mean-squared error quantity, performance index and/or cost function wherein the first and second transmitted signal vectors, $\underline{B}$, $\underline{R}$, are substantially independent therebetween (this may be referred to herein as "Case 1").

In some embodiments relating to Case 1, the values of $\underline{\gamma}$ and $\underline{\delta}$ that minimize $E[|\underline{\gamma}^T\underline{b} + \underline{\delta}^T\underline{r} - B_k|^2]$ may satisfy the following equations:

$$\underline{\bar{A}}\,\underline{\gamma} + \underline{\bar{E}}\,\underline{\delta} = \underline{1}_k;\text{ and}$$
$$\underline{\bar{O}}\,\underline{\gamma} + \underline{\bar{U}}\,\underline{\delta} = \underline{\bar{u}}\,\underline{1}_k;$$

wherein $$\underline{\bar{A}} = (\sigma_R^2/\sigma_B^2)\underline{\bar{a}}\,\underline{\bar{a}}^T + (1 + \sigma_n^2/\sigma_B^2)\underline{\bar{I}};$$
$$\underline{\bar{E}} = \underline{\bar{u}}^T + (\sigma_R^2/\sigma_B^2)\underline{\bar{a}};$$
$$\underline{\bar{O}} = \underline{\bar{u}} + (\sigma_R^2/\sigma_B^2)\underline{\bar{a}}^T;\text{ and}$$
$$\underline{\bar{U}} = \underline{\bar{u}}\,\underline{\bar{u}}^T + (\sigma_R^2/\sigma_B^2 + \sigma_v^2/\sigma_B^2)\underline{\bar{I}};$$

In the above equations, $\underline{1}_k$ denotes a column vector that includes all zero entries except for the $k^{th}$ entry thereof which is unity, and all quantities with a bar on top and a bar below represent matrices whose elements may be complex-valued, real, and/or imaginary. Further to the above, elements of the matrix $\underline{\bar{u}}$ represent levels of interference (leakage) from the blue sub-carriers, $\underline{B}$, to the red sub-carriers $\underline{R}$, $\underline{\bar{I}}$ denotes an identity matrix, $\sigma_n^2$ denotes variance of a component/element of $\underline{n}$, $\sigma_R^2$ denotes variance of a component/element of $\underline{R}$, $\sigma_B^2$ denotes variance of a component/element of $\underline{B}$, elements of the matrix $\underline{\bar{a}}$ represent levels of interference (leakage) from the red sub-carriers, $\underline{R}$, to the blue sub-carriers $\underline{B}$; and $\sigma_v^2$ denotes variance of a component/element of $\underline{v}$. --

Column 8, Line 49 through Column 9, Line 34: Delete and replace with the following -- In deriving the above equations, the quantities $\underline{B}$, $\underline{R}$, $\underline{n}$ and $\underline{v}$ may be assumed to be statistically independent therebetween and each one of the quantities $\underline{B}$, $\underline{R}$, $\underline{n}$ and $\underline{v}$ may be assumed to be of zero mean. In other embodiments, however, a statistical dependence (a non-zero correlation and/or non-zero covariance matrix) may be assumed between any two of the stated vector quantities and equations corresponding to such assumptions may be derived, as those skilled in the art will appreciate.

In other embodiments of the present invention, a signal processor may be configured to reduce and/or minimize (or substantially reduce and/or minimize) a mean-squared error quantity, performance index and/or cost function wherein the first and second transmitted signal vectors $\underline{B}$, $\underline{R}$ are substantially dependent therebetween (this may be referred to herein as "Case 2"). In some embodiments, the first and second transmitted signal vectors ($\underline{B}$, $\underline{R}$) may comprise substantially identical information (data) therebetween (e.g., $\underline{B} = \underline{R}$). Computer simulation results associated with Case 2, wherein $\underline{B} = \underline{R}$, show that a channel capacity measure may be increased by 100% in some embodiments of the invention, and by 50% in other embodiments of the invention, as is illustrated in FIG. 2. This may be a significant finding.

In some embodiments relating to Case 2, the values of $\underline{\gamma}$ and $\underline{\delta}$ that minimize $E[|\underline{\gamma}^T\underline{b} + \underline{\delta}^T\underline{r} - B_k|^2]$ may satisfy the following equations:

$$\underline{\bar{A}}'\,\underline{\gamma} + \underline{\bar{E}}'\,\underline{\delta} = \underline{\bar{a}}'\,\underline{1}_k;\text{ and}$$
$$\underline{\bar{O}}'\,\underline{\gamma} + \underline{\bar{U}}'\,\underline{\delta} = \underline{\bar{u}}'\,\underline{1}_k;$$

wherein $$\underline{\bar{A}}' = \underline{\bar{a}}'(\underline{\bar{a}}')^T + (\sigma_n^2/\sigma_B^2)\underline{\bar{I}};$$

$\bar{\underline{E}}' = \bar{\underline{a}}'(\bar{\underline{u}}')^T;$
$\bar{\underline{O}}' = \bar{\underline{u}}'(\bar{\underline{a}}')^T;$ and
$\bar{\underline{U}}' = \bar{\underline{u}}'(\bar{\underline{u}}')^T + (\sigma_v^2/\sigma_B^2)\bar{\underline{I}};$ wherein, as before, $\underline{1}_k$ denotes a column vector with all zero entries except for the $k^{th}$ entry thereof which is unity, and all quantities with a bar on top and a bar below represent matrices whose elements may be complex-valued, real-valued and/or imaginary-valued. Furthermore, $\bar{\underline{a}}' = \bar{\underline{I}} + \bar{\underline{a}}$ and $\bar{\underline{u}}' = \bar{\underline{I}} + \bar{\underline{u}}$; wherein $\bar{\underline{a}}$ and $\bar{\underline{u}}$ are as defined above relative to Case 1 with the elements of matrix $\bar{\underline{a}}$ representing levels of interference (i.e., leakage) from the red sub-carriers, R, to the blue sub-carriers, and with the elements of the matrix $\bar{\underline{u}}$ representing levels of interference (leakage) from the blue sub-carriers, B, to the red sub-carriers. Also, as defined earlier in connection with Case 1 above, $\sigma_n^2$ denotes variance of a component of n, $\sigma_v^2$ denotes variance of a component of v, $\sigma_B^2$ denotes variance of a component of B and $\bar{\underline{I}}$ denotes an identity matrix. In deriving the above equations, B, n and v have been assumed to be statistically independent therebetween and each of zero mean. In other embodiments, however, a statistical depen- --

Column 9, Line 43: Delete and replace with the following

-- substantially identical (e.g., B = R) information (data) therebe- --

Line 58 through Column 10, Line 2: Delete and replace with the following

-- In some embodiments of the present invention that are associated with what may be referred to herein as Case 3, only one of the first and second signals (B, R) is transmitted (for example, only B is transmitted) and a receiver processor may be configured, in some embodiments, substantially as in Case 1 with R → 0, (i.e., with each element/component of the vector R set to zero) to process the receiver observables that, in some embodiments, may be b = B + n and r = $\bar{\underline{u}}$ B + v. Computer simulation results associated with Case 3 (see FIG. 3), show that a power efficiency measure (e.g., $E_b/N_0$) may improve by up to 3 dB over that provided by conventional OFDM/OFDMA systems, devices and/or methods. --

Column 10, Lines 45-60: Delete and replace with the following

-- "Case 4." In these embodiments, a spatial isolation between first and second antennas of a base station (or any other device) is used (relied upon) to attenuate (suppress) matrices $\bar{\underline{a}}$ and $\bar{\underline{u}}$ by an amount "a" ($|a| < 1$). A receiver processor as in embodiments relating to Case 1 may be used to process received observable vectors b and r (expressed as b = B + a $\bar{\underline{a}}$ R + n; and r = a $\bar{\underline{u}}$ B + v) to derive information (data) associated with transmitted respective first and second end-user device signal vectors B and R, as is shown in FIG. 4a. Computer simulation results are presented in FIG. 4b. Configurations/embodiments of providing return-link communications as illustrated by FIG 4a, advantageously allow first and second end-user devices to send/transmit return-link information (data) to a base station (and/or any other system element) using respective first (B, blue, or solid) and second (R, red, or dotted) carriers/signals that are transmitted, by the respective --

Column 11, Lines 13-24: Delete and replace with the following

-- A receiver processor (at each end-user device), that may, according to some embodiments, be configured substantially as in Case 1, may be used to process received observable vectors b and r (as received by each end-user device) to derive information (data) associated with transmitted signal vectors B and R, as is shown in FIG. 5a. Computer simulation results are presented in FIG. 5b. Configurations/embodiments of providing forward-link communications as is illustrated in FIG. 5a, advantageously can allow first and second end-user devices to receive information (data) from a base station using respective first (B, blue, or solid) and second (R, red, or dotted) carriers that are staggered in frequency therebetween --

Lines 45 through Column 12, Line 3: Delete and replace with the following

-- the base station may transmit B and aR (instead of B and R); wherein $|a| < 1$.

For a first embodiment relating to Case 6, a receiver processor at an end-user device may be configured substantially as in Case 1 and may first be used to process the received observable vectors b = B + a ā R + n and r = a R + ū B + v to derive information (data) associated with transmitted signal vectors B. Once an estimate of B has been derived, it may be used to perform a cancellation of components related to B (that is, cancellation of the term ū B in r, without noise enhancement of r) thus deriving an estimate of R. Thus, in embodiments of the invention relating to Case 6, a two-stage (or a multi-stage) sequential receiver processor may be used.

For a second embodiment relating to Case 6, a receiver processor at a first end-user device, that may, according to some embodiments, be configured substantially as in Case 1, may first be used to process the received observable vectors b and r to derive information (data) associated with transmitted signal vector B. Once an estimate of B has been derived, the estimate of B may be relayed by the first end-user device to a second end-user device via a link (that may be a short-range link that is established directly between the first and second end-user devices) and the estimate of B may be used by the second end-user device to perform cancellation of components related to transmitted signal vector B (without noise enhancement) thus deriving an estimate of R. Thus, in --

Column 12, Lines 48-67: Delete and replace with the following

-- information (data) from a base station using first (B, blue, or solid) and second (R, red, or dotted) carriers that are staggered in frequency therebetween and transmitted by the same base station substantially co-channel, using substantially the same resources of an available frequency space/channel/bandwidth, as is illustrated in FIG. 1, thus increasing a spectral efficiency measure of the forward-link communications. In some embodiments, the staggering in frequency may be equal (or approximately equal) to 1/2T (i.e., one half of the inverse of a signaling interval as is illustrated in FIG. 1. In other embodiments, the staggering in frequency may be equal to one or more other values and/or may vary across an available frequency space. It will be understood that in some embodiments, one or more repeats of aR, over respective one or more signaling intervals, by a transmitter that is transmitting aR, may be used to increase an aggregate signal energy associated with a reception/detection of R (since $|a| < 1$). Accordingly, a probability of error associated with the reception/detection of R may be reduced at a reduction of capacity associated with the second/red signal, R. --

Column 13, Lines 30-35: Delete and replace with the following

-- used by a receiver to derive the frequency-domain observable vectors $\underline{b}$ and $\underline{r}$, respectively. These further embodiments of the present invention may, for example, relate to a MIMO receiver/transmitter, method and/or device, as will be appreciated by those skilled in the art. Accordingly, the noise vectors $\underline{n}$ and $\underline{v}$ may be statistically independent therebetween. It will be understood that a receiver, comprising the first and --

Column 13, Lines 57 through Column 14, Line 20: Delete and replace with the following -- antennas) as described above. In some embodiments, a correlation that may exist between the noise vectors $\underline{n}$ and $\underline{v}$ may not substantially degrade a communications performance, such as, for example, a bit error-rate, or the communications performance may be degraded by a small/acceptable amount. In some embodiments, a correlation that may exist between the noise vectors $\underline{n}$ and $\underline{v}$ may not substantially degrade communications performance if the quantity $\underline{\delta}^T$ (of the decision variable $\underline{\gamma}^T \underline{b} + \underline{\delta}^T \underline{r}$) is complex-valued and/or represents a rotation. In rotating $\underline{r}$, the noise $\underline{v}$ is also rotated, de-correlating $\underline{n}$ and $\underline{v}$.

Further to the embodiments described above and/or in the U.S. Provisional Applications cited herein, including all combinations and/or subcombinations thereof, a transmitter may be configured to transmit a signal vector $\underline{B}$ for the solid signal and the transmitter may also be configured to transmit a signal vector $\underline{R} = \underline{\bar{a}}^{-1} \underline{B}$ for the dotted signal (wherein "$\underline{\bar{a}}^{-1}$" denotes inverse of $\underline{\bar{a}}$). Accordingly, a receiver may be configured to derive frequency-domain observable vectors $\underline{b} = 2\underline{B} + \underline{n}$ and $\underline{r} = (\underline{\bar{a}}^{-1} + \underline{\bar{u}}) \underline{B} + \underline{v}$. Further, a receiver processor may be configured to combine the two frequency-domain observable vectors $\underline{b}$ and $\underline{r}$, yielding $b'_k = \underline{\gamma}^T \underline{b} + \underline{\delta}^T \underline{r}$, such as, for example, a mean-squared performance measure between $b'_k$ and $B_k$ (a $k^{th}$ element of $\underline{B}$) is minimized or reduced. It will be understood that the superscript "T" on a vector denotes transpose or conjugate transpose (i.e., Hermitian transpose), as appropriate. Furthermore, it will be understood that $B_k$ may be complex-valued and denotes the $k^{th}$ element of the data vector $\underline{B}$ ($k = 1, 2, ..., N$). Also, it will be understood that the receiver vectors $\underline{\gamma}$ and $\underline{\delta}$ may, in some embodiments, take-on different values for different values of the index k. --

Column 16, Lines 20-35: Delete and replace with the following

-- independent therebetween, and a first set of the 2N samples is used to form $\underline{b}$, while a second set of the 2N samples is used to form $\underline{r}$; wherein the second set of the 2N samples does not intersect (i.e., does not have any elements in common with) the first set of the 2N samples, the $\underline{n}$ and the $\underline{v}$ noise vectors will be uncorrelated and independent therebetween. --

Column 16, Lines 50-67: Delete and replace with the following

-- the 4N samples comprising, for example, N samples, may be used via a first N-point FFT to form a "$\underline{b'}$," at, for example, the frequencies $(k + N)/T$; $k = 1, 2, ..., N$; while a second subset of the 4N samples comprising, for example, N samples, may be used to form a "$\underline{r'}$," at, for example, the frequencies $(k + N + 1/2)/T$; $k = 1, 2, ..., N$; wherein, as before, the second subset of the 4N samples does not intersect the first subset of the 4N samples, thus allowing the $\underline{n'}$ noise vector (i.e., the noise component of $\underline{b'}$) and the $\underline{v'}$ noise vector (i.e., the noise component of $\underline{r'}$) to be uncorrelated and independent therebetween. But there are still 2N samples that have not been used. These remaining 2N samples may be used to form a further b" at, for example, the frequencies $(k + N + 1/4)/T; k = 1, 2, ..., N$; and a further r" at, for example, the frequencies $(k + N + 3/4)/T; k = 1, 2, ..., N$; and wherein at least some of b', r', b" and r" (and in some embodiments all of b', r', b" and r") may be combined therebetween, for example, using a LMSE criterion, or any other criterion, as has previously been discussed herein. This --

Column 17, Lines 45-54: Delete and replace with the following

-- wherein the plurality of channels may correspond to a respective plurality of users, a respective plurality of receiver vectors (in γ and/or in δ) may be used to accommodate the plurality of channels/users. Each channel of the plurality of channels may be associated with a different signal-to-noise ratio, necessitating, according to some embodiments, its own (individually optimized) γ and/or δ vectors. The γ and/or δ vectors may be updated (iteratively and/or non-iteratively) responsive to, for example, one or more measurements of, for example, a channel's signal-to-noise ratio. --